(12) United States Patent
Xue et al.

(10) Patent No.: US 11,943,056 B2
(45) Date of Patent: Mar. 26, 2024

(54) FLEXIBLE FREQUENCY DOMAIN RESOURCE ALLOCATION FOR SIDELINK

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/485,089

(22) Filed: Sep. 24, 2021

(65) Prior Publication Data

US 2023/0098101 A1 Mar. 30, 2023

(51) Int. Cl.
*H04W 72/0453* (2023.01)
*H04L 1/1812* (2023.01)
*H04W 72/20* (2023.01)

(52) U.S. Cl.
CPC ....... *H04L 1/1812* (2013.01); *H04W 72/0453* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2018/0270022 A1* | 9/2018 | Sun | ............ | H04L 1/0061 |
| 2019/0182859 A1* | 6/2019 | Khoryaev | ............ | H04W 52/42 |
| 2020/0304247 A1* | 9/2020 | Loehr | ............ | H04W 4/40 |
| 2020/0412485 A1* | 12/2020 | Wang | ............ | H04L 1/0073 |
| 2022/0140968 A1* | 5/2022 | Luo | ............ | H04L 5/0094 |
| | | | | 370/329 |
| 2022/0201732 A1* | 6/2022 | Takeda | ............ | H04W 72/23 |
| 2022/0247539 A1* | 8/2022 | Luo | ............ | H04L 1/1854 |
| 2022/0303969 A1* | 9/2022 | Hwang | ............ | H04W 72/20 |
| 2022/0361232 A1* | 11/2022 | Zhao | ............ | H04L 5/0094 |
| 2022/0368465 A1* | 11/2022 | Wong | ............ | H04L 1/1621 |
| 2022/0369291 A1* | 11/2022 | Shibaike | ............ | H04L 1/1893 |
| 2023/0047819 A1* | 2/2023 | Ding | ............ | H04W 16/14 |

FOREIGN PATENT DOCUMENTS

WO WO-2021056419 A1 * 4/2021

* cited by examiner

*Primary Examiner* — The Hy Nguyen
(74) *Attorney, Agent, or Firm* — Holland & Hart LLP/Qualcomm Incorporated

(57) ABSTRACT

Methods, systems, and devices supporting flexible frequency domain resource allocation (FDRA) for sidelink are described. For example, a wireless device may receive, over a sidelink channel, control information including a parameter associated with a first FDRA of a first transport block (TB) associated with an initial transmission and an indication of a second FDRA of a second TB associated with a subsequent transmission after the initial transmission. The wireless device may identify the first FDRA of the first TB based on receiving the control information and may communicate one or more signals over the sidelink channel based on identifying the first FDRA of the first TB and receiving the indication of the second FDRA of the second TB. In some examples, the wireless device may receive, over a second sidelink channel, second control information including a second parameter associated with a size of the second TB.

26 Claims, 16 Drawing Sheets

FLEXIBLE FREQUENCY DOMAIN RESOURCE ALLOCATION FOR SIDELINK

FIELD OF TECHNOLOGY

The following relates to wireless communications, including flexible frequency domain resource allocation for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, sidelink channel communications include the use of a physical sidelink control channel (PSCCH) and a physical sidelink shared channel (PSSCH), each occupying at least one subchannel. A wireless device may receive sidelink control information (SCI) on the PSCCH, the SCI including control information on how to decode a transport block (TB).

SUMMARY

The described techniques relate to improved methods, systems, devices, and apparatuses that support flexible frequency domain resource allocation for sidelink. Generally, the described techniques provide for a wireless device receiving control information including information associated with a frequency domain resource allocation for an initial transport block and information associated with a frequency domain resource allocation for a subsequent transport block. The wireless device may identify the frequency domain resource allocation for the initial transport block and the frequency domain resource allocation for the subsequent transport block, and may communicate over the sidelink channel with one or more other wireless devices based on receiving the control information and identifying the frequency domain resource allocations for the initial transport block and the subsequent transport block. Further, the wireless device may receive second control information including information associated with a transport block size of the subsequent transport block. For example, in cases where the subsequent transport block is a retransmission of the initial transport block, the second control information may indicate a transport block size of the subsequent transport block based on a TBS of the initial transport block.

A method for wireless communications at a wireless device is described. The method may include receiving, over a sidelink channel, control information including a parameter associated with a first frequency domain resource allocation of a first transport block associated with an initial transmission and an indication of a second frequency domain resource allocation of a second transport block associated with a subsequent transmission after the initial transmission, identifying the first frequency domain resource allocation of the first transport block based on receiving the control information that includes the parameter and the indication, and communicating, over the sidelink channel, one or more signals based on identifying the first frequency domain resource allocation of the first transport block and receiving the indication of the second frequency domain resource allocation of the second transport block.

An apparatus for wireless communications at a wireless device is described. The apparatus may include a processor, memory coupled with the processor, and instructions stored in the memory. The instructions may be executable by the processor to cause the apparatus to receive, over a sidelink channel, control information including a parameter associated with a first frequency domain resource allocation of a first transport block associated with an initial transmission and an indication of a second frequency domain resource allocation of a second transport block associated with a subsequent transmission after the initial transmission, identify the first frequency domain resource allocation of the first transport block based on receiving the control information that includes the parameter and the indication, and communicate, over the sidelink channel, one or more signals based on identifying the first frequency domain resource allocation of the first transport block and receiving the indication of the second frequency domain resource allocation of the second transport block.

Another apparatus for wireless communications at a wireless device is described. The apparatus may include means for receiving, over a sidelink channel, control information including a parameter associated with a first frequency domain resource allocation of a first transport block associated with an initial transmission and an indication of a second frequency domain resource allocation of a second transport block associated with a subsequent transmission after the initial transmission, means for identifying the first frequency domain resource allocation of the first transport block based on receiving the control information that includes the parameter and the indication, and means for communicating, over the sidelink channel, one or more signals based on identifying the first frequency domain resource allocation of the first transport block and receiving the indication of the second frequency domain resource allocation of the second transport block.

A non-transitory computer-readable medium storing code for wireless communications at a wireless device is described. The code may include instructions executable by a processor to receive, over a sidelink channel, control information including a parameter associated with a first frequency domain resource allocation of a first transport block associated with an initial transmission and an indication of a second frequency domain resource allocation of a second transport block associated with a subsequent transmission after the initial transmission, identify the first frequency domain resource allocation of the first transport block based on receiving the control information that includes the parameter and the indication, and communicate, over the sidelink channel, one or more signals based on identifying the first frequency domain resource allocation of the first transport block and receiving the indication of the second frequency domain resource allocation of the second transport block.

In some examples of the method, apparatuses, and non-transitory computer-readable medium described herein, identifying the first frequency domain resource allocation may include operations, features, means, or instructions for applying a scaling factor to the second frequency domain resource allocation, where the parameter associated with the first frequency domain resource allocation of the first transport block includes the scaling factor.

In some examples of the method, apparatuses, and non-transitory computer-readable medium described herein, identifying the first frequency domain resource allocation may include operations, features, means, or instructions for combining an adjustment factor with the second frequency domain resource allocation, where the parameter associated with the first frequency domain resource allocation of the first transport block includes the adjustment factor.

In some examples of the method, apparatuses, and non-transitory computer-readable medium described herein, the parameter includes a second indication of the first frequency domain resource allocation of the first transport block, and identifying the first frequency domain resource allocation may be based on the second indication included in the control information.

In some examples of the method, apparatuses, and non-transitory computer-readable medium described herein, the parameter includes an index associated with stored values of the first frequency domain resource allocation of the first transport block.

Some examples of the method, apparatuses, and non-transitory computer-readable medium described herein may further include operations, features, means, or instructions for identifying a stored value of the stored values that may be associated with the index based on receiving the index, where identifying the first frequency domain resource allocation may be based on the stored value.

In some examples of the method, apparatuses, and non-transitory computer-readable medium described herein, the stored values include one or more frequency domain resources, one or more scaling factors, or one or more adjustment factors associated with the first frequency domain resource allocation.

In some examples of the method, apparatuses, and non-transitory computer-readable medium described herein, the control information includes a second indication including an index associated with stored values of the first frequency domain resource allocation of the first transport block and with stored values of the second frequency domain resource allocation for the second transport block.

In some examples of the method, apparatuses, and non-transitory computer-readable medium described herein, the indication of the second frequency domain resource allocation of the second transport block includes an indication of a leading subchannel.

Some examples of the method, apparatuses, and non-transitory computer-readable medium described herein may further include operations, features, means, or instructions for receiving, over a second sidelink channel, second control information including a second parameter associated with a size of the second transport block and determining the size of the second transport block based on receiving the second control information.

In some examples of the method, apparatuses, and non-transitory computer-readable medium described herein, determining the size of the second transport block may include operations, features, means, or instructions for identifying, within the second control information, code block group information associated with the first transport block, where the size of the second transport block may be based on the code block group information.

In some examples of the method, apparatuses, and non-transitory computer-readable medium described herein, determining the size of the second transport block may include operations, features, means, or instructions for applying a scaling factor to a size of the first transport block, where the second parameter includes the scaling factor.

In some examples of the method, apparatuses, and non-transitory computer-readable medium described herein, determining the size of the second transport block may include operations, features, means, or instructions for combining an adjustment factor with a size of the first transport block, where the second parameter includes the adjustment factor.

In some examples of the method, apparatuses, and non-transitory computer-readable medium described herein, determining the size of the second transport block may include operations, features, means, or instructions for identifying a stored value associated with the second index and corresponding to the size of the second transport block.

In some examples of the method, apparatuses, and non-transitory computer-readable medium described herein, determining the size of the second transport block may include operations, features, means, or instructions for identifying, within the second control information, a bit field indicating the size of the second transport block.

Some examples of the method, apparatuses, and non-transitory computer-readable medium described herein may further include operations, features, means, or instructions for identifying a format associated with the control information, where identifying the first frequency domain resource allocation of the first transport block may be based on the format associated with the control information.

In some examples of the method, apparatuses, and non-transitory computer-readable medium described herein, the control information includes sidelink control information.

Some examples of the method, apparatuses, and non-transitory computer-readable medium described herein may further include operations, features, means, or instructions for transmitting, to a second wireless device over the sidelink channel, a request to retransmit a portion of the first transport block, where the second transport block includes the portion of the first transport block.

In some examples of the method, apparatuses, and non-transitory computer-readable medium described herein, the request to retransmit the portion of the first transport block includes an indication of an amount of frequency domain resources for the second transport block.

In some examples of the method, apparatuses, and non-transitory computer-readable medium described herein, the control information may be associated with a configured grant for sidelink communications.

In some examples of the method, apparatuses, and non-transitory computer-readable medium described herein, the control information may be communicated over a physical sidelink control channel and the first transport block and the second transport block may be communicated over a physical sidelink shared channel.

A method for wireless communications at a wireless device is described. The method may include identifying a first frequency domain resource allocation of a first transport block associated with an initial transmission, identifying a second frequency domain resource allocation of a second transport block associated with a subsequent transmission, where identifying the first frequency domain resource allocation is based on identifying the second frequency domain resource allocation of the second transport block, transmitting, over a sidelink channel, control information including a parameter associated with the first frequency domain resource allocation and an indication of the second frequency domain resource allocation, and communicating, over the sidelink channel, one or more signals based on identifying the first frequency domain resource allocation of the first transport block and identifying the second frequency domain resource allocation of the second transport block.

An apparatus for wireless communications at a wireless device is described. The apparatus may include a processor, memory coupled with the processor, and instructions stored in the memory. The instructions may be executable by the processor to cause the apparatus to identify a first frequency domain resource allocation of a first transport block associated with an initial transmission, identify a second frequency domain resource allocation of a second transport block associated with a subsequent transmission, where identifying the first frequency domain resource allocation is based on identifying the second frequency domain resource allocation of the second transport block, transmit, over a sidelink channel, control information including a parameter associated with the first frequency domain resource allocation and an indication of the second frequency domain resource allocation, and communicate, over the sidelink channel, one or more signals based on identifying the first frequency domain resource allocation of the first transport block and identifying the second frequency domain resource allocation of the second transport block.

Another apparatus for wireless communications at a wireless device is described. The apparatus may include means for identifying a first frequency domain resource allocation of a first transport block associated with an initial transmission, means for identifying a second frequency domain resource allocation of a second transport block associated with a subsequent transmission, where identifying the first frequency domain resource allocation is based on identifying the second frequency domain resource allocation of the second transport block, means for transmitting, over a sidelink channel, control information including a parameter associated with the first frequency domain resource allocation and an indication of the second frequency domain resource allocation, and means for communicating, over the sidelink channel, one or more signals based on identifying the first frequency domain resource allocation of the first transport block and identifying the second frequency domain resource allocation of the second transport block.

A non-transitory computer-readable medium storing code for wireless communications at a wireless device is described. The code may include instructions executable by a processor to identify a first frequency domain resource allocation of a first transport block associated with an initial transmission, identify a second frequency domain resource allocation of a second transport block associated with a subsequent transmission, where identifying the first frequency domain resource allocation is based on identifying the second frequency domain resource allocation of the second transport block, transmit, over a sidelink channel, control information including a parameter associated with the first frequency domain resource allocation and an indication of the second frequency domain resource allocation, and communicate, over the sidelink channel, one or more signals based on identifying the first frequency domain resource allocation of the first transport block and identifying the second frequency domain resource allocation of the second transport block.

In some examples of the method, apparatuses, and non-transitory computer-readable medium described herein, transmitting the control information may include operations, features, means, or instructions for transmitting the control information including a scaling factor, where the parameter includes the scaling factor.

In some examples of the method, apparatuses, and non-transitory computer-readable medium described herein, transmitting the control information may include operations, features, means, or instructions for transmitting the control information including an adjustment factor, where the parameter includes the adjustment factor.

In some examples of the method, apparatuses, and non-transitory computer-readable medium described herein, the parameter includes a second indication of the first frequency domain resource allocation of the first transport block.

Some examples of the method, apparatuses, and non-transitory computer-readable medium described herein may further include operations, features, means, or instructions for determining an index associated with stored values of the first frequency domain resource allocation of the first transport block, where the parameter includes the index.

In some examples of the method, apparatuses, and non-transitory computer-readable medium described herein, the stored values include one or more frequency domain resources, one or more scaling factors, or one or more adjustment factors associated with the first frequency domain resource allocation.

In some examples of the method, apparatuses, and non-transitory computer-readable medium described herein, transmitting the control information may include operations, features, means, or instructions for transmitting the control information including a second indication including an index associated with stored values of the first frequency domain resource allocation of the first transport block and with stored values of the second frequency domain resource allocation for the second transport block.

In some examples of the method, apparatuses, and non-transitory computer-readable medium described herein, the indication of the second frequency domain resource allocation of the second transport block includes an indication of a leading subchannel.

Some examples of the method, apparatuses, and non-transitory computer-readable medium described herein may further include operations, features, means, or instructions for determining a size of the second transport block and transmitting, over a second sidelink channel, second control information including a second parameter associated with the size of the second transport block.

In some examples of the method, apparatuses, and non-transitory computer-readable medium described herein, transmitting the second control information may include operations, features, means, or instructions for transmitting, within the second control information, code block group information associated with the first transport block, where the size of the second transport block may be based on the code block group information.

In some examples of the method, apparatuses, and non-transitory computer-readable medium described herein, transmitting the second control information may include operations, features, means, or instructions for transmitting the second control information including a scaling factor, where the second parameter includes the scaling factor.

In some examples of the method, apparatuses, and non-transitory computer-readable medium described herein, transmitting the second control information may include operations, features, means, or instructions for transmitting the second control information including an adjustment factor, where the second parameter includes the adjustment factor.

In some examples of the method, apparatuses, and non-transitory computer-readable medium described herein, determining the size of the second transport block may include operations, features, means, or instructions for identifying a stored value associated with the second index and corresponding to the size of the second transport block.

In some examples of the method, apparatuses, and non-transitory computer-readable medium described herein, transmitting the second control information may include operations, features, means, or instructions for transmitting the second control information including a bit field indicating the size of the second transport block.

In some examples of the method, apparatuses, and non-transitory computer-readable medium described herein, the control information corresponds to a format, and the first frequency domain resource allocation of the first transport block may be based on the format of the control information.

In some examples of the method, apparatuses, and non-transitory computer-readable medium described herein, the control information includes sidelink control information.

Some examples of the method, apparatuses, and non-transitory computer-readable medium described herein may further include operations, features, means, or instructions for receiving, from a second wireless device over the sidelink channel, a request to retransmit a portion of the first transport block, where the second transport block includes the portion of the first transport block.

In some examples of the method, apparatuses, and non-transitory computer-readable medium described herein, the request to retransmit the portion of the first transport block includes an indication of an amount of frequency domain resources for the second transport block.

In some examples of the method, apparatuses, and non-transitory computer-readable medium described herein, the control information may be associated with a configured grant for sidelink communications.

In some examples of the method, apparatuses, and non-transitory computer-readable medium described herein, the control information may be communicated over a physical sidelink control channel and the first transport block and the second transport block may be communicated over a physical sidelink shared channel.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
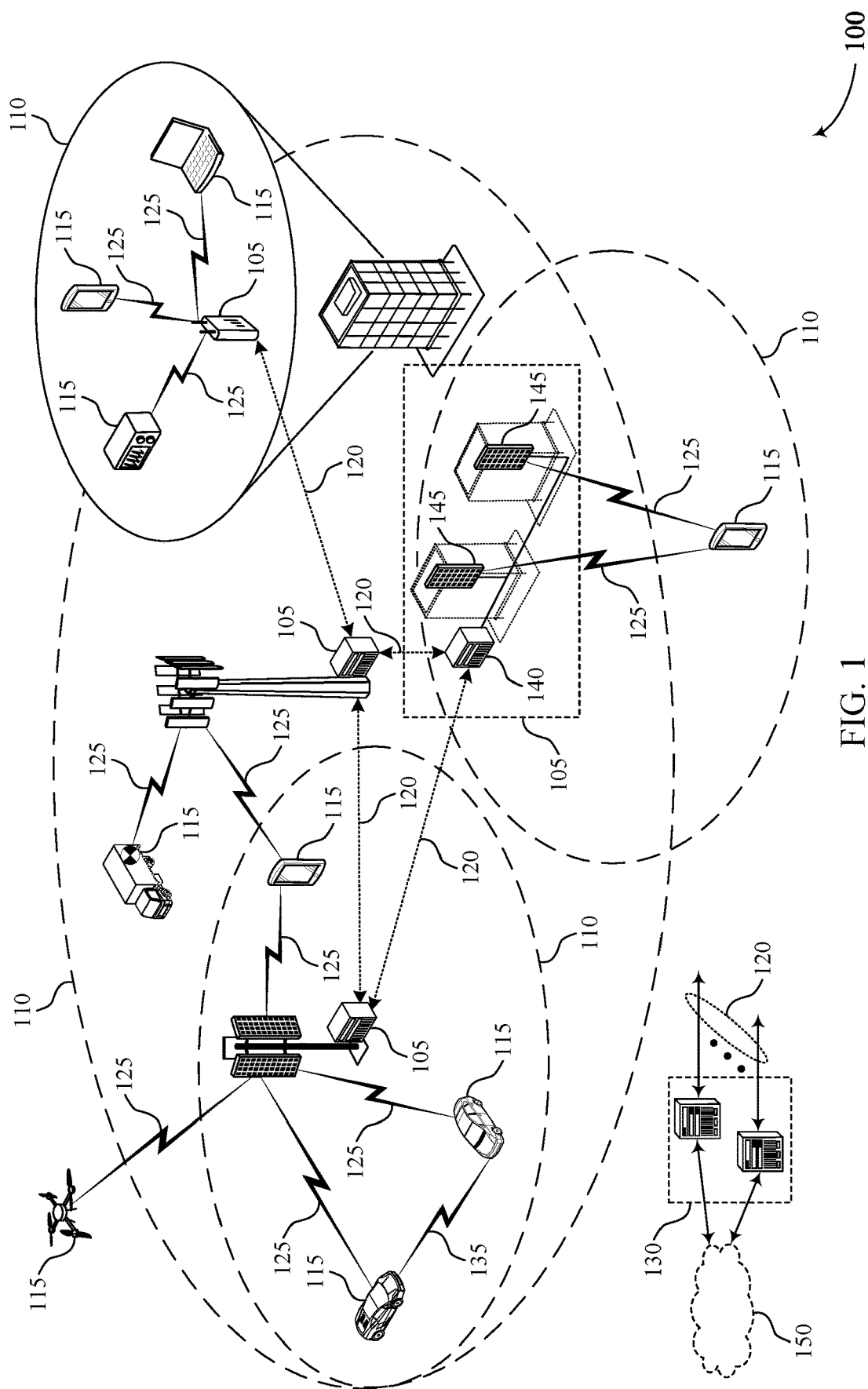
FIGS. 1 and 2 illustrate examples of wireless communications systems that support flexible frequency domain resource allocation (FDRA) for sidelink in accordance with aspects of the present disclosure.

Sidelink communications may include the use of a physical sidelink control channel (PSCCH) and a physical sidelink shared channel (PSSCH), each occupying at least one subchannel. A wireless device may receive sidelink control information (SCI) on the PSCCH, where the SCI may include control information on how to decode a transport block (TB). The wireless device may receive the TB on the PSSCH and may decode the TB using the control information in the received SCI. Some sidelink wireless communications systems support relatively large bandwidths (e.g., approximately 1.8 GHz available in the 5 GHz/6 GHz unlicensed band and approximately 7 GHz in the 60 GHz unlicensed band) such that wireless devices may communicate using larger TBs (e.g., jumbo TBs). In such examples, communicating devices may segment the TBs in the frequency domain into one or more code block groups (CBGs). Segmenting TBs into one or more CBGs may support more efficient communications, for example, in cases where a wireless device is requested to retransmit a TB or a portion of a TB. For example, sidelink wireless communications systems may support hybrid automatic repeat request (HARQ) such that a receiving device may transmit a HARQ response indicating successful (or unsuccessful) reception of a TB to a transmitting device. If the receiving device indicates a failed TB reception, the transmitting device may send a retransmission to the receiving device. In some cases, the receiving device may indicate a failed reception of specific CBGs, or portions of a TB. In some cases, SCI may not include information associated with CBG allocations, making it difficult for a receiving device to indicate a specific CBG, for example, in a HARQ response. Enhanced control information supporting sidelink CBG retransmissions may be desired.

A wireless device may transmit control information including information supporting flexible frequency domain resource allocations (FDRAs) in a communication environment. For example, a wireless device may transmit an SCI, associated with an initial TB, to a receiving device. The SCI may include an indication of an FDRA (e.g., a number of subchannels) for the initial (or current) TB and an indication of an FDRA for a subsequent TB. In some cases, the wireless device may indicate the FDRA for the initial TB as a scaling factor (e.g., multiple) of the FDRA for the subsequent TB. In other cases, the wireless device may indicate the FDRA for the initial TB as an adjustment (e.g., addition/subtraction) of the FDRA for the subsequent TB. In some cases, the wireless device may indicate the FDRA for the initial TB in an additional FDRA codepoint (e.g., in addition to an FDRA for a subsequent TB in the control information). The additional FDRA codepoint may include an explicit indication of a number of subchannels for the initial TB or the additional FDRA codepoint may include a pointer associated with a table of defined FDRA information for the initial TB (e.g., defined before the communication link is established and stored in a memory of the wireless device). In some examples, the additional FDRA codepoint may include a pointer associated with a table of defined FDRA information for both the initial TB and the subsequent TB (e.g., defined before the communication link is established and stored in a memory of the wireless device). In some cases, the wireless device may indicate a leading subchannel of the FDRA for the subsequent TB.

Further, the wireless device may transmit a second SCI, associated with the subsequent TB, including an indication of a TB size (TBS) for the subsequent TB. In some cases, the indication of the TBS for the subsequent TB may be associated with a TBS of the initial TB. For example, the wireless device may indicate that the TBS for the subsequent TB may be the same TBS as a CBG of the initial TB. In other cases, the wireless device may indicate the TBS for the subsequent TB as a scaling factor of the TBS of the initial TB or an adjustment factor of the TBS of the initial TB. In some cases, the wireless device may indicate the TBS of the subsequent TB with the additional FDRA codepoint. In some other cases, the wireless device may indicate the TBS of the subsequent TB in a new bit field of the SCI.

The FDRA for the initial TB may indicate one or more CBGs for the initial TB. For example, the initial TB may be segmented into a quantity of subchannels based on the FDRA for the initial TB. In such examples, each subchannel may correspond to a respective CBG such that the initial TB may include a quantity of CBGs equal to the quantity of subchannels. Indicating the FDRA for the initial TB may support CBG retransmissions as a receiving device may be aware of the CBG division for the initial TB and may signal CBG retransmissions based on that information.

Aspects of the disclosure are initially described in the context of wireless communications systems. Aspects of the disclosure are also described in the context of resource configurations and process flows. Aspects of the disclosure are further illustrated by and described with reference to apparatus diagrams, system diagrams, and flowcharts that relate to flexible FDRA for sidelink.

FIG. 1 illustrates an example of a wireless communications system 100 that supports flexible FDRA for sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a wireless device may identify that within a control message, an additional FDRA codepoint indicates that an initial, or current TB occupies a different quantity of subchannels as compared to a subsequent, or reserved TB. In some examples, the additional FDRA codepoint may include a scaling factor, an adjustment number, may point to an FDRA table, along with other methods of indicating FDRA for the initial TB.

Devices may further be configured to indicate TBS for subsequent, or reserved PSSCH. In some examples, to facilitate CBG based retransmissions, CBG transmission information (CBGTI) and CBG flushing out information (CBGFI) may be signaled in a second control message. The presence of CBGTI and CBGFI in the second control message may indicate that a wireless device may use a same TBS as indicated in a previous SCI associated with a TB, where at least a portion of the TB is to be retransmitted. For example, the second control message may include a CBGTI, a CBGFI, or both, indicating that the wireless device may receive the subsequent TB using the TBS of the portion of the initial TB (e.g., a CBG of the initial TB) as indicated in a previous control message. Additionally or alternatively, the second control message may include scaling factors, adjustment factors, specific TBS values, additional bit fields, or a combination thereof, to indicate the TBS of the subsequent TB.

Figure 2:
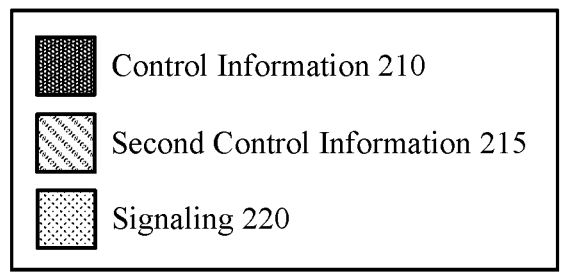
Figure 2:
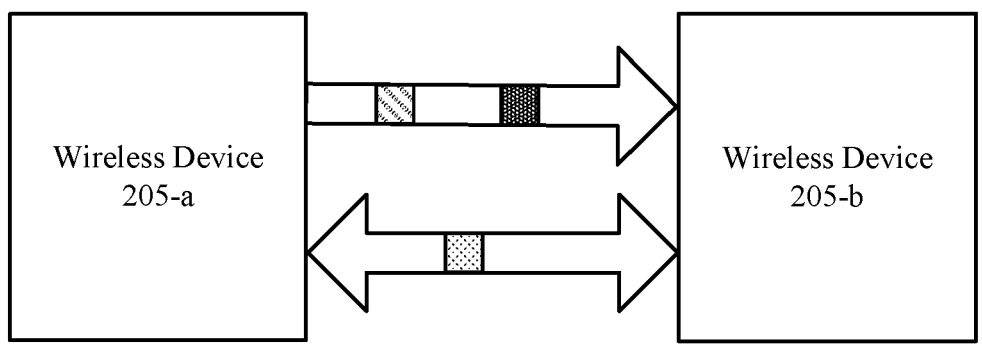

FIG. 2 illustrates an example of a wireless communications system 200 that supports flexible FDRA for sidelink in accordance with aspects of the present disclosure. The wireless communications system 200 may implement or be implemented by aspects of the wireless communications system 100. For example, the wireless communications system 200 may include a wireless device 205-a and a wireless device 205-b, which may be examples of base stations 105, UEs 115, sidelink enabled devices, or any other device as described with reference to FIG. 1. The wireless device 205-a and the wireless device 205-b may communicate using NR sidelink, where the wireless device 205-a may transmit, and the wireless device 205-b may receive, control information 210 indicating an FDRA of a first TB.

In some cases, the wireless device 205-a and the wireless device 205-b may communicate using NR sidelink communications. For example, the wireless device 205-a may be a vehicle with wireless communication capabilities, where the wireless device 205-a may support V2X communications. In such an environment, the wireless device 205-a may transmit relatively small, periodic messages (e.g., safety related messages) to one or more other devices, such as the wireless device 205-b over a sidelink communication link (e.g., using a sub-6 GHz, licensed band).

In some cases, sidelink communications may include two resource allocation (or channel access) modes. In a first resource allocation mode (e.g., mode 1), for an in-coverage deployment, a device (e.g., a transmitting device) may receive a grant for sidelink channel access. For example, the wireless device 205-a may be located in coverage area corresponding to (or served) by a base station (e.g., a gNB) and, in accordance with the first resource allocation mode, the wireless device 205-a may receive a grant from the base station to access a sidelink channel (e.g., managed scheduling techniques). In a second resource allocation mode (e.g., mode 2), for an autonomous deployment, a device (e.g., a transmitting device) may use sensing to perform distributed channel access. For example, the wireless device 205-a may use contention-based scheduling techniques (e.g., with performing a channel sensing procedure) to access a sidelink channel. In some cases, each sidelink channel may include a PSCCH and a PSSCH, where the PSCCH and the PSSCH may each occupy at least one subchannel to transmit data in a TB. To support decoding data on the PSSCH, a device may receive SCI on the PSCCH. For example, the wireless device 205-a may transmit control information 210, to the wireless device 205-b on the PSCCH, and may transmit a TB to the wireless device 205-b on the PSSCH. The control information 210 may include information specifying that the wireless device 205-b may decode the TB as well as information on how to decode the TB. In some cases, devices may communicate using jumbo TBs, supporting transmitting TBs with relatively large payloads (e.g., as compared to transmitting TBs). To transmit a jumbo TB, a transmitting device may assign the jumbo TB to more than one subchannel on the PSSCH.

In some cases, sidelink devices may support HARQ communications, for example, to improve the reliability of unicast and groupcast communications. For example, the wireless device 205-a may be a transmitting device, where the wireless device 205-a may transmit one or more TBs to the wireless device 205-b. In such an example, the wireless device 205-a may transmit control information 210 to the wireless device 205-b, where the control information 210 may further include a request for a HARQ response from the wireless device 205-b. Upon receiving the request for the HARQ response, the wireless device 205-a may transmit the HARQ response, to the wireless device 205-a, on the physical sidelink feedback channel (PSFCH). For example, the wireless device 205-b may transmit a one bit response, to the wireless device 205-a, indicating successful (or unsuccessful) reception of the one or more TBs. In some cases, the wireless device 205-a may retransmit the one or more TBs, for example, in cases where the wireless device 205-a fails to receive an acknowledgement (ACK) message. As such, the wireless device 205-a may retransmit the one or more TBs using a same quantity of subchannels the wireless device 205-*a* used for the original transmission of the one or more TBs.

Sidelink communications may be applicable to one or more industries, enterprises, and other vertical domains. However, in some domains, access to specific frequencies and frequency ranges may be limited, for example, within the sub-6 GHz licensed band. There may be available frequency ranges in one or more unlicensed bands supporting relatively large bandwidth communications. For example, there may be approximately 1.8 GHz available in the 5 GHz/6 GHz unlicensed band and approximately 7 GHz available in the 60 GHz unlicensed band. Using such wider bandwidths may create different deployment scenarios, as compared to using limited bandwidths, for example, in the licensed spectrum. For example, eMBB-like communication traffic may be relatively dominant (e.g., frequent) where one or more vertical domains may support relatively high bandwidth communications. As such, communicating devices may use jumbo TBs more frequently, for example, when communicating using long data bursts. However, in some cases, communicating using jumbo TBs may result in relatively low spectral efficiency, for example, in HARQ based communication environments. For example, the wireless device 205-*a* may transmit a jumbo TB to the wireless device 205-*b* using five subcarriers. The wireless device 205-*b* may fail to receive a portion of the jumbo TB, so the wireless device 205-*b* may indicate unsuccessful reception of the jumbo TB to the wireless device 205-*a*. As such, the wireless device 205-*a* may retransmit the entire jumbo TB to the wireless device 205-*b*, as compared to retransmitting the portion of the jumbo TB that the wireless device 205-*b* failed to receive.

In some examples, sidelink communications may support CBG transmissions, where TBs may be divided into one or more CBGs. As per the previous example, the wireless device 205-*a* may transmit a jumbo TB to the wireless device 205-*b* using five subcarriers. In such an example, the jumbo TB may be divided into five CBGs, for example, divided per subcarrier. Transmitting TBs divided into CBGs may reduce a number of resources used for retransmissions. For example, the wireless device 205-*b* may indicate an unsuccessful reception of a TB in accordance with a block error rate (BLER) threshold (e.g., with 10% BLER as a rate control operating point). In such an example, the wireless device 205-*b* may determine that the BLER for a portion of the TB satisfies the BLER threshold. The portion of the TB may be (or may be part of) a CBG of the TB. CBG based HARQ communications may support the wireless device 205-*b* indicating unsuccessful reception of the CBG, where the wireless device 205-*a* may retransmit the CBG indicated by the wireless device 205-*b* instead of retransmitting the entire TB.

Some wireless communications systems may not support CBG transmissions and may thus use a same number of subchannels for both initial transmissions and retransmissions. Additionally, in such cases, resource reservation may be declared through over the air (OTA) signaling (e.g., for contention-based scheduling techniques), for example in stage-one SCI to facilitate autonomous channel access (e.g., mode 2). For example, in stage-one SCI, retransmissions may be indicated for one length for up to three PSSCH transmissions (e.g., TBs). That is, there may be one "length" indication for up to three PSSCHs, such that retransmissions use the same number of subchannels as their original transmissions.

As such, flexible FDRA for retransmissions may be desired, for example, in wireless communications systems using non-CBG transmissions. For example, in a mode 2 deployment (e.g., autonomous channel access) with a relatively heavy load, as compared to the bandwidth of a communication link, three subchannels (or fewer) may be available. In this example, a first, a second, and a third subchannel may be available, where the first subchannel and the second subchannel may each have relaxed demodulation reference signal (DMRS) thresholds. In some examples, a transmitting device may perform a first transmission occupying the first subchannel and the second subchannel. If the transmitting device is to retransmit a portion of the first transmission, the transmitting device may schedule the retransmission for the third subchannel, for example, to satisfy a packet delay budget.

In some examples, to perform flexible FDRA, a sidelink device may indicate an additional FDRA codepoint in a PSCCH message, where the codepoint may define one or more subchannels for PSSCH transmissions, for example, different from what may be indicated in a non-flexible FDRA environment (e.g., with a frequency resource assignment configuration). In some cases, when performing sensing procedures, a sidelink device may parse through a frequency resource assignment configuration to identify channel resource reservations. For example, the wireless device 205-*a* may transmit the control information 210 on the PSCCH indicating a frequency resource assignment configuration. The wireless device 205-*b* may receive the control information 210 and may parse through the frequency resource assignment configuration to identify one or more resource reservations, for example, for subsequent transmissions.

The wireless device 205-*b* may identify that within the control information 210, the additional FDRA codepoint indicates that an initial, or current PSSCH occupies a different quantity of subchannels as compared to a subsequent, or reserved PSSCH. In some examples, the additional FDRA codepoint may include a scaling factor (e.g., s), indicating that a quantity of subchannels of the initial PSSCH is s-times a quantity of subchannels of the subsequent PSSCH. In other examples, the additional FDRA codepoint may include an adjustment number (e.g., δ) indicating that the quantity of subchannels of the initial PSSCH occupies δ more (or δ) less subchannels than the quantity of subchannels of the subsequent PSSCH. Additionally or alternatively, the additional FDRA codepoint may point to an FDRA table (e.g., in L1 bits) indicating the FDRA for the initial PSSCH. The FDRA table may include one or more scaling factors, adjustment numbers, explicit FDRA indications (e.g., explicit subchannel quantities), or any other value corresponding to FDRA assignment for the initial PSSCH. Using flexible FDRA, wireless devices 205 may be operable to communicate, over the sidelink channel, signaling 220 in response to identifying the FDRA for the initial PSSCH. Such signaling 220 may include data payloads, control signaling, one or more TBs, among other examples.

In further support of flexible FDRA, devices may be configured to indicate TBS for subsequent, or reserved PSSCH. In some examples, to facilitate CBG based retransmissions, CBGTI and CBGFI may be signaled in second control information 215 (e.g., in stage-two SCI for retransmissions). The presence of CBGTI and CBGFI in the second control information 215 may indicate that the wireless device 205-*b* may use a same TBS as indicated in a previous SCI carrying the same TB. For example, the second control information 215 may include a CBGTI, a CBGFI, or both, indicating that the wireless device 205-b may receive the subsequent PSSCH using the same TBS as the initial PSSCH as indicated in a previous control information (e.g., the control information 210). Additionally or alternatively, the second control information 215 may include scaling factors, adjustment factors, specific TBS values, additional bit fields, or a combination thereof, to indicate the TBS of the subsequent TB. Thus, wireless devices 205 may communicate, over the sidelink channel, signaling 220 in response to identifying the TBS for the subsequent PSSCH.

Some wireless communications systems, such as NR Uu deployments, may support TBS indications using reserved modulation and coding scheme (MCS). That is, a device may indicate an MCS for a reserved transmission, in part, specifying a size of the subsequent transmission. However, devices using NR sidelink communications may use explicit MCS indications to decode stage-two SCI and may not be configured to use reserved MCS to indicate TBS. In such cases, a device receiving a TB may calculate TBS for each received PSSCH, and to avoid ambiguity, retransmissions for each received PSSCH may be arranged to be received with the same parameters (e.g., same TBS, same MCS, same DMRS pattern) as the original PSSCH transmission. Arranging PSSCH retransmissions to mirror the same parameters as their respective original PSSCH transmissions may diminish the flexibility of sidelink communications. To facilitate flexible FDRA (e.g., with CBGs) another indicator for TBS, other than CBGTI and CGBFI, such as the TBS indicator in the second control information 215, may be desired.

As such, configuring wireless devices 205 to indicate FDRA for an initial TB and a TBS for a subsequent TB according to the methods descried herein (e.g., supporting flexible FDRA) may improve the efficiency of communication resource usage. For example, providing signaling supporting the use of CBG transmissions in a sidelink communication environment may reduce an amount of resources used for TB retransmissions.

Figure 3:
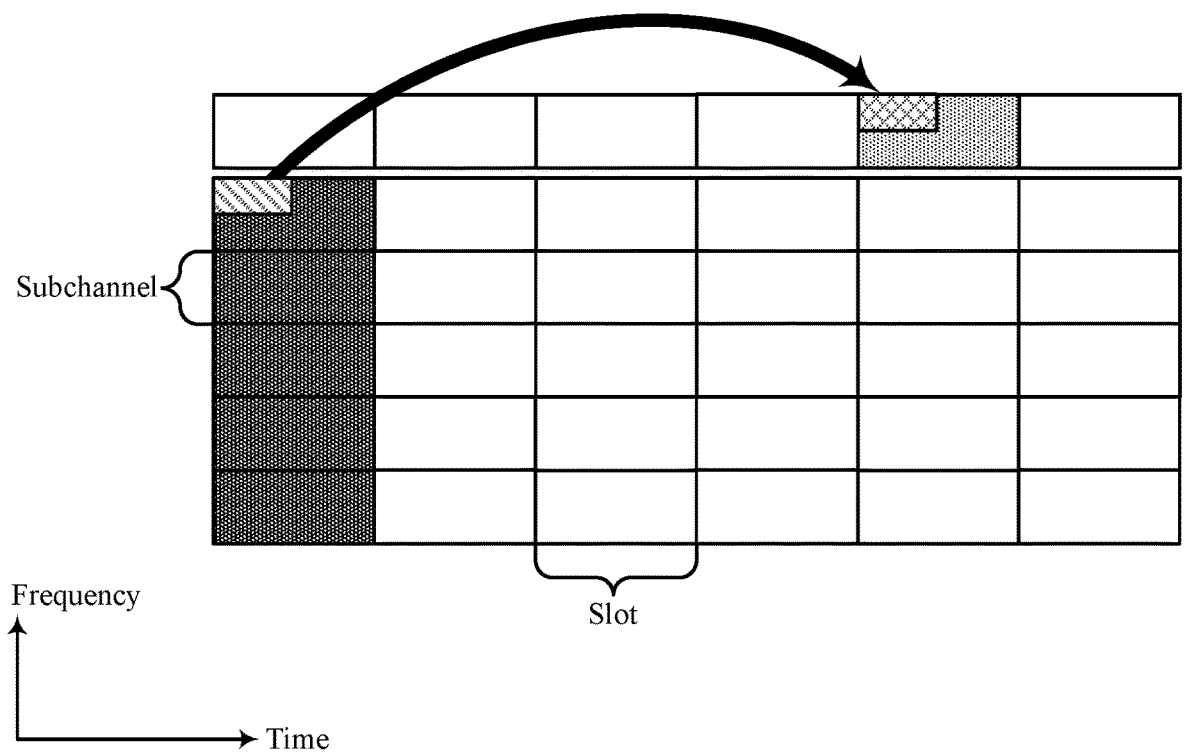
FIG. 3 illustrates an example of a resource configuration that supports flexible FDRA for sidelink in accordance with aspects of the present disclosure.

FIG. 3 illustrates an example of a resource configuration 300 that supports flexible FDRA for sidelink in accordance with aspects of the present disclosure. In some examples, the resource configuration 300 may implement aspects of wireless communications system 100 or 200. In this example, a transmitting device (e.g., wireless device 205-a as described with reference to FIG. 2) may be configured to transmit one or more TBs to a receiving device (e.g., wireless device 205-b as described with reference to FIG. 2) according to resource configuration 300. That is, the transmitting device may transmit a first TB 305 on a PSSCH and a first control information 310 on a PSCCH to a receiving device. The first TB 305 may be equivalently referred to as an initial TB or a current TB. Additionally, the transmitting device may transmit a second TB 315 on a PSSCH and a second control information 320 on a PSCCH to the receiving device. The second TB 315 may be equivalently referred to as a reserved TB or a subsequent TB. The transmitting device may include information within the first control information 310 and the second control information 320 to support flexible FDRA as described herein.

To support flexible frequency domain resource allocations for transmissions and retransmissions, the transmitting device may indicate respective FDRA for a current (or initial) PSSCH and reserved (or subsequent) PSSCH(s). For example, the first control information 310 may indicate an FDRA for the first TB 305 (e.g., FDRA1) and an FDRA for the second TB 315 (e.g., FDRA2). In resource configuration 300, the first control information 310 may indicate that the first TB 305 may be assigned to five subchannels and the second TB 315 may be assigned to one subchannel. In some examples, the transmitting device may include a scaling factor (e.g., $s \geq 1$) in the first control information 310, where the scaling factor may indicate that a quantity of subchannels of the current TB may be s-times a quantity of subchannels indicated in the FDRA for the second TB 315 (e.g., in a frequency resource assignment configuration as described with reference to FIG. 2). For example, in resource configuration 300, the first control information 310 may indicate a scaling factor of five, indicating that the first TB 305 may be transmitted across five times the subchannels indicated in the FDRA for the second TB 315. The receiving device may receive the first control information 310 including the scaling factor and may obtain the quantity of subchannels for the reserved PSSCH. By multiplying the quantity of subchannels for the reserved PSSCH, the receiving device may obtain the quantity of subchannels for the current PSSCH and may reconstruct the PSSCH DMRS accordingly, for example, to proceed to decoding stage-two SCI. In cases where the first control information 310 includes the scaling factor to indicate the FDRA for the initial TB, there may be no impact to a reservation mechanism used by devices not configured for flexible FDRA (e.g., referencing solely the frequency resource assignment configuration).

Additionally or alternatively, the transmitting device may include an adjustment factor (e.g., $\delta$), where the adjustment factor may indicate that the quantity of subchannels of the current PSSCH occupies $\delta$ more (or $\delta$ less) subchannels than the quantity of subchannels of the subsequent PSSCH (e.g., in the frequency resource assignment configuration). For example, in resource configuration 300, the first control information may include an adjustment factor equal to four, where the receiving device may determine that the quantity of subchannels for the first TB 305 may be equal to four more subchannels than the quantity of subchannels for the second TB 315.

In some examples, the transmitting device may include an additional FDRA codepoint (e.g., information element or portion of an information element) for the current PSSCH. In some cases, the additional FDRA codepoint may include an absolute quantity of subchannels of the current PSSCH. For example, in resource configuration 300, the first control information 310 may include the additional FDRA codepoint containing an explicit indication of five subchannels for the first TB 305. As such, the receiving device may receive the first control information 310 and may determine that the first TB 305 spans five subchannels.

In some cases, the additional FDRA codepoint may include a pointer to a table of stored values (e.g., an L3 table), where the table of stored values may include a defined set of FDRAs (e.g., predefined FDRAs and other parameters), for example, as a set of absolute subchannel quantities, scaling factors, or adjustment numbers. The receiving device may receive the first control information 310 and identify the additional FDRA for the first TB 305 based on the codepoint pointing to an absolute subchannel quantity (e.g., five subchannels), a scaling factor (e.g., $s=5$), or an adjustment number (e.g., $\delta=4$), in the table of stored values. In some examples, the additional FDRA codepoint may be logically independent from a reservation field. That is, the additional FDRA codepoint may be independent from a field indicating the FDRA for the subsequent TB, or a subsequent TB reservation field. As such, in cases where the first control information 310 includes the additional FDRA codepoint, there may be no impact to a reservation mechanism used by devices not configured for flexible FDRA.

In some examples, the additional FDRA codepoint may indicate an FDRA for all PSSCHs (i.e., an FDRA for the initial PSSCH and an FDRA for the subsequent PSSCH). In such examples, the receiving device may receive the additional FDRA codepoint and may understand that the additional FDRA codepoint may apply to both the initial PSSCH and the subsequent PSSCH. That is, the receiving device may use the additional FDRA codepoint, rather than the indication in a subsequent TB reservation field (e.g., within the frequency resource assignment configuration), to determine the FDRA for the subsequent PSSCH. In such cases, the starting points indicated by frequency indicator values (IVs) in the subsequent TB reservation field may remain valid. In some cases, the additional FDRA codepoint may include a pointer to a table of stored values (e.g., an L3 table), where the table of stored values may include a predefined set of FDRAs, for example, as a set of absolute subchannel quantities, scaling factors, or adjustment numbers for the initial TB and the subsequent TB. In some examples, the FDRA codepoint may include an index indicating an FDRA1 and an FDRA2 corresponding to the initial TB FDRA and the subsequent TB FDRA, respectively. As an illustrative example, the table of stored values may include FDRA indications as described with Table 1.

TABLE 1

| Index | FDRA1 | FDRA2 |
|---|---|---|
| 0 | 4 | 1 |
| 1 | 5 | 1 |
| ... | ... | ... |

In the example of resource configuration 300, the receiving device may receive the first control information 310 with the additional FDRA codepoint including an index of 1. As such, and with reference to Table 1, the receiving device may determine that the first TB 305 may span five subchannels and that the second TB 315 may span one subchannel.

In some examples, the transmitting device may redefine the subsequent TB reservation field to specify a leading subchannel of respective reserved (subsequent) PSSCHs. In some cases, the subsequent TB reservation field may specify both a leading subchannel (i.e., a frequency starting point) as well as a quantity of subchannels (i.e., a length, in the frequency domain, of the TB). In such cases, the quantity of subchannels of the subsequent TB reservation field may be signaled using $$\left[\log_2\left(\frac{N_{subChannel}^{SL}(N_{subChannel}^{SL}+1)}{2}\right)\right]$$

bits when sl-MaxNumPerReserve is configured as 2 and may be signaled using $$\left[\log_2\left(\frac{N_{subChannel}^{SL}(N_{subChannel}^{SL}+1)(2N_{subChannel}^{SL}+1)}{6}\right)\right]$$

bits when sl-MaxNumPerReserve is configured as 3. The transmitting device may redefine the subsequent TB reservation field to specify the leading subchannel (i.e., a frequency starting point only). In such cases, the leading subchannel may be signaled using $[\log_2(N_{subChannel}^{SL})]$ bits when sl-MaxNumPerReserve is configured as 2 and may be signaled using $2[\log_2(N_{subChannel}^{SL})]$ bits when sl-MaxNumPerReserve is configured as 3. Redefining the subsequent TB reservation field to specify solely the leading subchannel may correspond to considerable gain, for example, signaling only the leading subchannel may reduce a quantity of bits used to signal FDRA.

In some examples, such as within an SCI of a retransmission PSSCH, the transmitting device may indicate a determined TBS to the receiving device. In the example of resource configuration 300, the transmitting device may indicate the TBS of the second TB 315 within the second control information 320. In some examples, the transmitting device may indicate the TBS with the presence of a CBGTI, a CBGFI, or both in stage-two SCI. For example, the second control information 320 may include a CBGTI, a CBGFI, or both, which may indicate the TBS of the second TB 315. The receiving device may thus be indicated to use a TBS from the initial TB for a CBG retransmission such as in cases where the second TB 315 is a retransmission of a portion (e.g., a CBG) of the first TB 305. In some examples, the transmitting device may indicate the TBS with a scaling factor. For example, the second control information 320 may include a scaling factor and the receiving device may determine the TBS for the second TB 315 by multiplying the scaling factor with a TBS of the first TB 305, for example, a TBS received in the first control information 310. In some examples, the transmitting device may indicate the TBS with an adjustment factor. For example, the second control information 320 may include the adjustment factor and the receiving device may determine the TBS for the second TB 315 by adding (or subtracting) the adjustment factor to (or from) the TBS of the first TB 305. In some other examples, the transmitting device may indicate the TBS in the additional FDRA codepoint. In some cases, the additional FDRA codepoint may indicate the TBS as an explicit size, for example, in addition to the one or more FDRA indications. In yet other examples, the transmitting device may indicate the TBS in an additional bit field within stage-two SCI. For example, the second control information 320 may include an additional bit field corresponding to the TBS of the second TB 315.

In some examples, the techniques as described herein may be applied to enhance downlink control information (DCI) signaling, for example, to support flexible FDRA in NR sidelink mode 1. For example, in an in-coverage deployment, the transmitting device may receive a grant for sidelink channel access, where the grant may be transmitted by a base station serving an area where the transmitting device is located. In such examples, the base station may transmit the grant as a DCI format 3_0, including a frequency resource assignment configuration. The techniques described herein may thus interact with the frequency resource assignment configuration within the DCI format 3_0. That is, the DCI format 3_0 may include an FDRA for the initial TB as a scaling factor of the FDRA of the subsequent TB (e.g., from the frequency resource assignment configuration), an adjustment factor of the FDRA of the subsequent TB, an explicit number of subchannels, a pointer to a table of stored values associated with FDRA. Further, the DCI format 3_0 may indicate the FDRA for the subsequent TB as a leading subchannel.

In some examples, a base station may use a DCI (e.g., DCI format 3_0) to request, from the transmitting device, an uplink control information (UCI) with more than one bit to determine whether a retransmission may be requested. If retransmission is requested, the UCI may further indicate an amount of radio resources (e.g., in terms of a quantity of subchannels) that the transmitting device may use for the retransmission. For example, the transmitting device may receive a retransmission request from the receiving device and the transmitting device may transmit a UCI, to the base station, indicating the retransmission request. In some examples, the receiving device may indicate a portion of a TB for retransmission and the transmitting device may further indicate, within the UCI, an amount of resources requested for the retransmission of the portion of the TB. In some cases, the transmitting device may indicate the amount of resources based on, or otherwise referencing, an amount of resources used for the previous transmission (e.g., within a previous grant). As an illustrative example, the UCI may include a two-bit (e.g., m=2) indication of the retransmission request as described with Table 2.

TABLE 2

| m = 2 | Request for retransmission resources |
|---|---|
| "00" | None |
| "01" | One quarter of #subchannels of previous grant |
| "10" | One half of #subchannels of previous grant |
| "11" | Same # of subchannels as previous grant |

In the example of resource configuration 300, the transmitting device may transmit the first TB 305 using five subchannels. In some examples, the receiving device may fail to receive a portion of the first TB 305. For example, the receiving device may fail to receive the portion of the first TB 305 transmitted via a first subchannel, or a first CBG of the first TB 305. As such, the receiving device may request a retransmission of the portion of the first TB 305. The transmitting device may transmit a UCI to a serving base station, the UCI including a request for sidelink retransmission resources that the transmitting device may use to retransmit the portion of the first TB 305. In the case of resource configuration 300, the transmitting device may request one fifth of the quantity of subchannels used for the initial transmission of the first TB 305. As such, the serving base station may transmit a grant to the transmitting device such that the transmitting device may transmit the second TB 315 as a retransmission of the portion of the first TB 305, the second TB 315 occupying a single subcarrier.

In further support of flexible FDRA, the techniques as described herein may apply to CG communications in NR sidelink. That is, a sidelink CG may include an FDRA for an initial TB as a scaling factor of the FDRA of a subsequent TB, an adjustment factor of the FDRA of the subsequent TB, an explicit number of subchannels, a pointer to a table of stored values associated with FDRA, and in some cases, as a leading subchannel. Further, CG communications may support retransmission requests and subcarrier quantity specification as described with reference to the transmitting device transmitting UCI to a serving base station.

Configuring devices to indicate FDRA for an initial TB and a TBS for a subsequent TB according to the methods descried herein may support a more granular allocation of resources, reducing use of extraneous communication resources, thereby increasing the efficiency of wireless communications. For example, signaling TB transmissions according to resource configuration 300 may reduce an amount of resources used for TB retransmissions.

Figure 4:
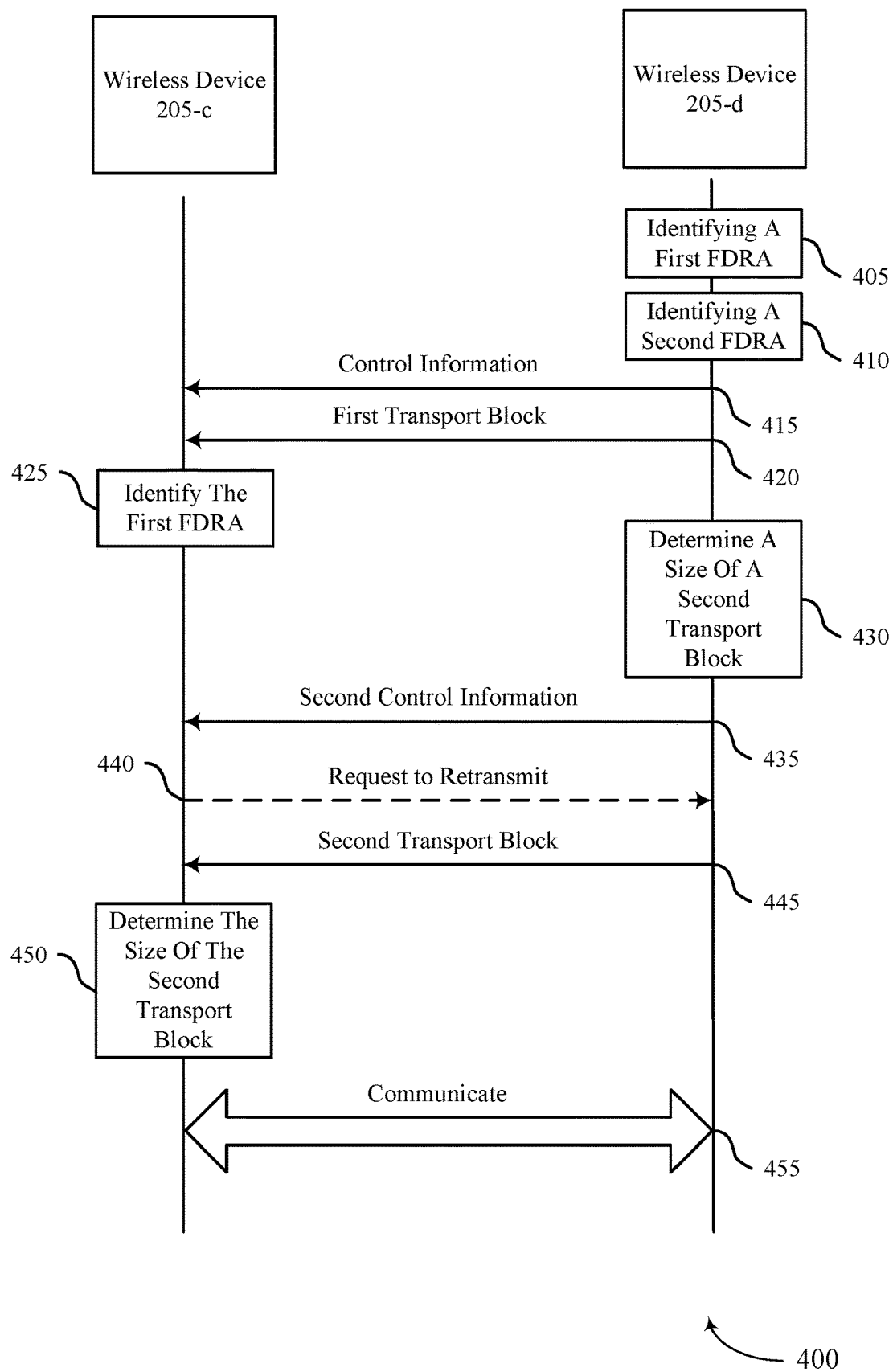
FIG. 4 illustrates an example of a process flow that supports flexible FDRA for sidelink in accordance with aspects of the present disclosure.

FIG. 4 illustrates an example of a process flow 400 that supports flexible FDRA for sidelink in accordance with aspects of the present disclosure. In some examples, the process flow 400 may implement aspects of wireless communications systems 100 or 200. For example, process flow 400 may include wireless device 205-c and wireless device 205-d, which may be examples of corresponding devices as described with reference to FIG. 2. Further, process flow 400 may implement aspects of resource configuration 300 as described with reference to FIG. 3. For example, the wireless devices 205 may communicate according to resource configuration 300, such that the wireless devices 205 may support flexible FDRA in a sidelink communications environment.

In the following description of the process flow 400, the operations may be performed (e.g., reported or provided) in a different order than the order shown, or the operations performed by the wireless devices 205 may be performed in different orders or at different times. For example, specific operations also may be left out of the process flow 400, or other operations may be added to the process flow 400. Further, although some operations or signaling may be shown to occur at different times for discussion purposes, these operations may actually occur at the same time.

At 405, wireless device 205-d may identify a first FDRA of a first TB associated with an initial transmission. For example, wireless device 205-d may identify that the first TB may occupy a first quantity of subchannels, such as five subchannels corresponding to the first TB 305 as described with reference to FIG. 3.

At 410, wireless device 205-d may identify a second FDRA of a second TB associated with a subsequent transmission, where identifying the first FDRA may be based on identifying the second FDRA of the second TB. For example, wireless device 205-d may identify that the second TB may occupy a second quantity of subchannels, such as one subchannel corresponding to the second TB 315 as described with reference to FIG. 3.

At 415, wireless device 205-d may transmit, and wireless device 205-c may receive, control information including a parameter associated with the first FDRA and an indication of the second FDRA. In some cases, the control information may be communicated over a PSCCH. In some examples, the wireless device 205-d may transmit the control information including a scaling factor, where the parameter associated with the first FDRA includes the scaling factor. In some examples, the wireless device 205-d may transmit the control information including an adjustment factor, where the parameter includes the adjustment factor. In some examples, the parameter may include a second indication of the first FDRA of the first TB. For example, the parameter may include an explicit, or absolute, indication of a quantity of subchannels for the first TB. In some examples, the wireless device 205-d may determine an index associated with stored values of the first FDRA of the first TB, where the parameter may include the index. In such examples, the stored values may include one or more frequency domain resources (e.g., explicit subchannel quantities), one or more scaling factors, or one or more adjustment factors associated with the first FDRA. In some examples, the wireless device 205-d may transmit the control information including a second indication including an index associated with stored values of the first FDRA of the first TB and with stored values of the second FDRA for the second TB. For example, the wireless device 205-d may transmit the control information including the second indication including an index as described in Table 1. In any case, the indication of the second FDRA of the second TB may include an indication of a leading subchannel, for example, as described with reference to FIG. 3. Additionally or alternatively, the control information may be associated with a CG for sidelink communications.

At 420, the wireless device 205-d may transmit the first TB to the wireless device 205-c. For example, the wireless device 205-d may transmit the first TB using five subcarriers, such as the five subcarriers used to transmit the first TB 305 as described with reference to FIG. 3. The first TB may be communicated over a PSSCH.

At 425, the wireless device 205-c may identify the first FDRA of the first TB based on receiving the control information that includes the parameter and the indication. In some examples, the wireless device 205-c may apply the scaling factor to the second FDRA, where the parameter associated with the first FDRA of the first TB includes the scaling factor. To identify the first FDRA, the wireless device 205-c may multiply the scaling factor with the second FDRA, where the product of the multiplication may be the first FDRA. In some examples, the wireless device 205-c may combine the adjustment factor with the second FDRA, where the parameter associated with the first FDRA of the first TB includes the adjustment factor. To identify the first FDRA, the wireless device 205-c may add or subtract the adjustment factor to or from the second FDRA, where the sum or difference may be the first FDRA. In examples where the parameter includes the second indication of the first FDRA of the first TB, identifying the first FDRA may be based on the second indication included in the control information. That is, the wireless device 205-c may identify the first FDRA based on receiving an explicit, or absolute, indication of a quantity of subchannels for the first FDRA. In examples where the parameter includes an index associated with stored values of the first FDRA of the first TB, the wireless device 205-c may identify a stored value of the stored values that is associated with the index based on receiving the index, where identifying the first FDRA may be based on the stored value. In some cases, the control information may include a second indication including an index associated with stored values of the first FDRA of the first TB and with stored values of the second FDRA for the second TB. As such, the wireless device 205-c may receive the second indication and may determine both the first FDRA and the second FDRA based on the index. In some examples, the indication of the second FDRA of the second TB may include an indication of a leading subchannel (e.g., redefining a subsequent TB reservation field as described with reference to FIG. 3). In some examples, the wireless device 205-c may be configured to identify a format associated with the control information, where identifying the first FDRA of the first TB may be based on the format associated with the control information. In such examples, the control information may be (or may be within) SCI.

At 430, the wireless device 205-d may determine a size of the second TB. That is, the wireless device 205-d may determine a TBS of the second TB, for example, in cases where the second TB may be a retransmission of at least a portion of the first TB. In some examples, the wireless device 205-d may determine the TBS of the second TB based on a TBS of the first TB. For example, the wireless device 205-b may associate the TBS of the second TB with a CBGTI, a CBGFI, or both of the first TB, a scaling factor of the TBS of the first TB, an adjustment factor of the TBS of the first TB, or the like.

At 435, the wireless device 205-d may transmit, and the wireless device 205-c may receive, over a second sidelink channel, second control information including a second parameter associated with the size of the second TB. In some cases, the second control information may be communicated over the PSCCH. In some examples, the wireless device 205-d may transmit, within the second control information, CBG information associated with the first TB, where the size of the second TB may be based on the CBG. For example, in cases where the second TB includes a retransmission of a portion of the first TB, the presence of CBGTI, CBGFI, or both, within the second control information, may indicate that the TBS of the second TB may be the same as the TB of the portion of the first TB. In some examples, the wireless device 205-d may transmit the second control information including a scaling factor, where the second parameter includes the scaling factor. In some examples, the wireless device 205-d may transmit the second control information including an adjustment factor, where the second parameter includes the adjustment factor. In some examples, the second parameter may include a second index associated with stored values associated with TBS. For example, the second index may be associated with stored values such as the stored values in Table 1. That is, in some examples, the Table 1 may additionally include one or more TBS values such that the second index may point to a specific value in Table 1 (e.g., in the additional FDRA codepoint). In such examples, determining the size of the second TB may further include identifying a stored value associated with the second index and corresponding to the size of the second TB. In some examples, wireless device 205-d may transmit the second control information including a bit field indicating the size of the second TB. Phrased alternatively, the wireless device 205-d may transmit the second control information including an additional bit field for indicating the size of the second TB.

In some examples, at 440, the wireless device 205-c may transmit, to the wireless device 205-d over the sidelink channel, a request to retransmit a portion of the first TB. For example, the wireless device 205-c may fail to receive, or decode, a CBG of the first TB and the wireless device 205-c may indicate the failure to the wireless device 205-d. In some examples, the request to retransmit the portion of the first TB may include an indication of an amount of frequency domain resources for the second TB. For example, the request to retransmit the portion of the first TB may include an indication that the second TB may occupy one subchannel such as the one subchannel allocated to the second TB 315 as described with reference to FIG. 3.

At 445, the wireless device 205-d may transmit, and the wireless device 205-c may receive, the second TB (e.g., communicated over the PSSCH). For example, the wireless device 205-d may transmit the second TB using one subcarrier, such as the one subcarrier used to transmit the second TB 315 as described with reference to FIG. 3. In some examples, the wireless device 205-d may transmit a UCI to a base station to request access to the sidelink channel in accordance with sidelink channel access mode 1. In such cases, the UCI may include an indication of an amount of frequency domain resources for the second TB. The base station may grant the sidelink channel access request for the amount of frequency domain resources for the second TB. In some examples, the base station may grant the request by transmitting a DCI (e.g., DCI format 3_0) to the wireless device 205-d.

At 450, the wireless device 205-c may determine the size of the second TB based on receiving the second control information. In some examples, the wireless device 205-c may determine the size of the second TB by identifying, within the second control information, CBG information associated with the first TB, where the size of the second TB is based on the CBG information. For example, in cases where the second TB is a retransmission of a portion of the first TB (e.g., a CBG of the first TB), the presence of CBGTI, CBGFI, or both in the second control information may indicate that the size of the second TB corresponds to the size of the portion of the first TB. In some examples, the wireless device 205-c may determine the size of the second TB by applying the scaling factor to a size of the first TB, where the second parameter includes the scaling factor. That is, the wireless device 205-c may multiply the scaling factor to the size of the first TB, the product being the size of the second TB. In some examples, the wireless device 205-c may determine the size of the second TB by combining the adjustment factor to a size of the first TB, where the second parameter includes the adjustment factor. That is, the wireless device 205-c may add or subtract the adjustment factor to or from the size of the first TB, where the sum or difference may be the size of the second TB. In examples where the second parameter includes the second index associated with stored values associated with TBS, the wireless device 205-c may identify a stored value associated with the second index and corresponding to the size of the second TB. In some examples, the wireless device 205-c may identify, within the second control information, a bit field indicating the size of the second TB. That is, the wireless device 205-c may identify an additional bit field for indicating the size of the second TB, within the second control information.

At 455, the wireless device 205-c and the wireless device 205-d may communicate, over the sidelink channel, one or more signals based on identifying the first FDRA of the first TB and receiving the indication of the second FDRA of the second TB.

Figure 5:
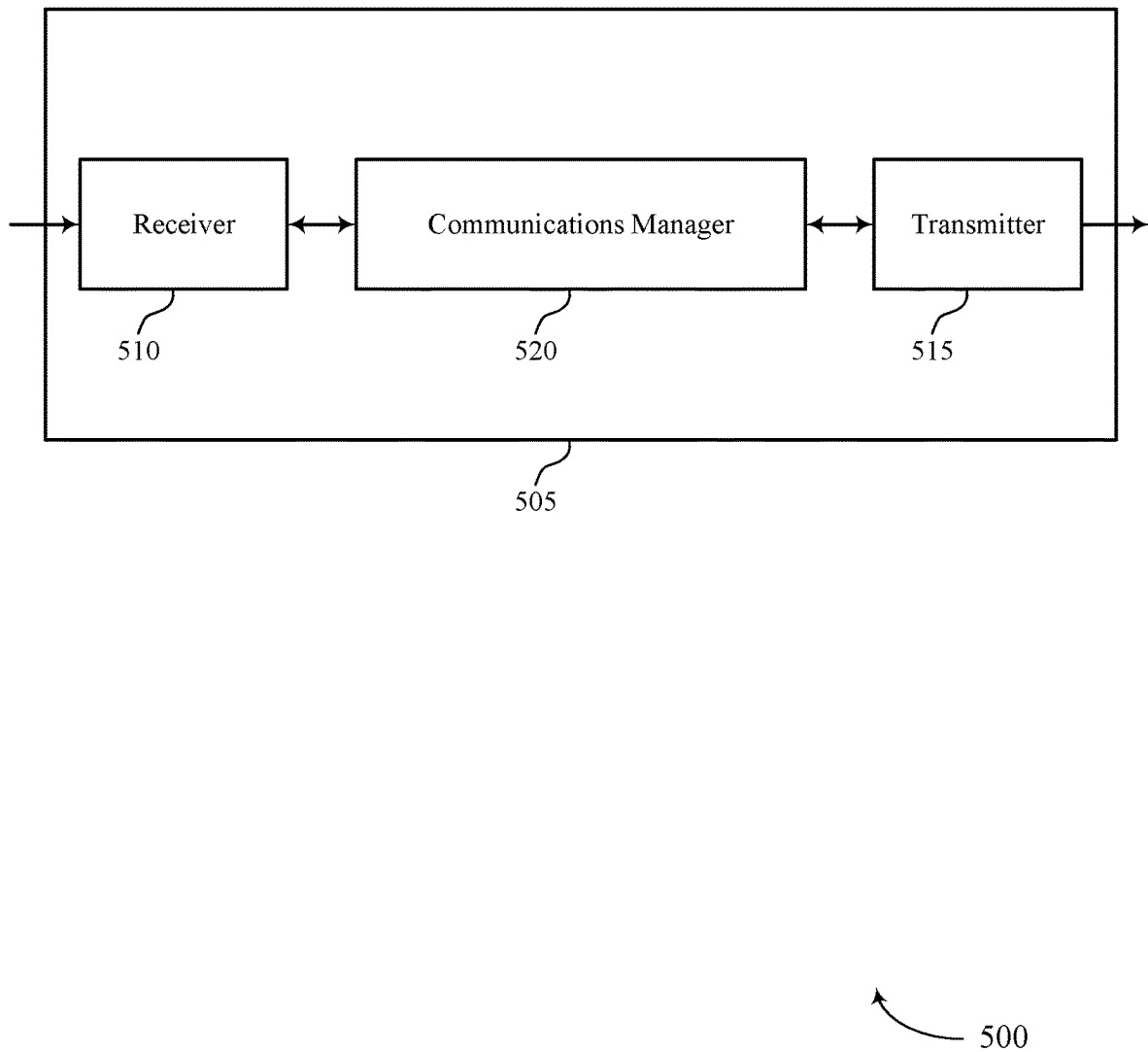
FIGS. 5 and 6 show block diagrams of devices that support flexible FDRA for sidelink in accordance with aspects of the present disclosure.

FIG. 5 shows a block diagram 500 of a device 505 that supports flexible FDRA for sidelink in accordance with aspects of the present disclosure. The device 505 may be an example of aspects of a wireless device, such as a receiving device (e.g., a UE, a base station, a sidelink enabled device, a wireless device as described with reference to FIGS. 2 through 4) as described herein. In some examples, the receiving device may be a transmitting device as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to flexible FDRA for sidelink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to flexible FDRA for sidelink). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of flexible FDRA for sidelink as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an ASIC, a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a wireless device in accordance with examples as disclosed herein. For example, the communications manager 520 may be configured as or otherwise support a means for receiving, over a sidelink channel, control information including a parameter associated with a first FDRA of a first TB associated with an initial transmission and an indication of a second FDRA of a second TB associated with a subsequent transmission after the initial transmission. The communications manager 520 may be configured as or otherwise support a means for identifying the first FDRA of the first TB based on receiving the control information that includes the parameter and the indication. The communications manager 520 may be configured as or otherwise support a means for communicating, over the sidelink channel, one or more signals based on identifying the first FDRA of the first TB and receiving the indication of the second FDRA of the second TB.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for receiving control information supporting flexible FDRA, resulting in more efficient utilization of communication resources, reduced power usage, and diminished extraneous signal processing.

Figure 6:
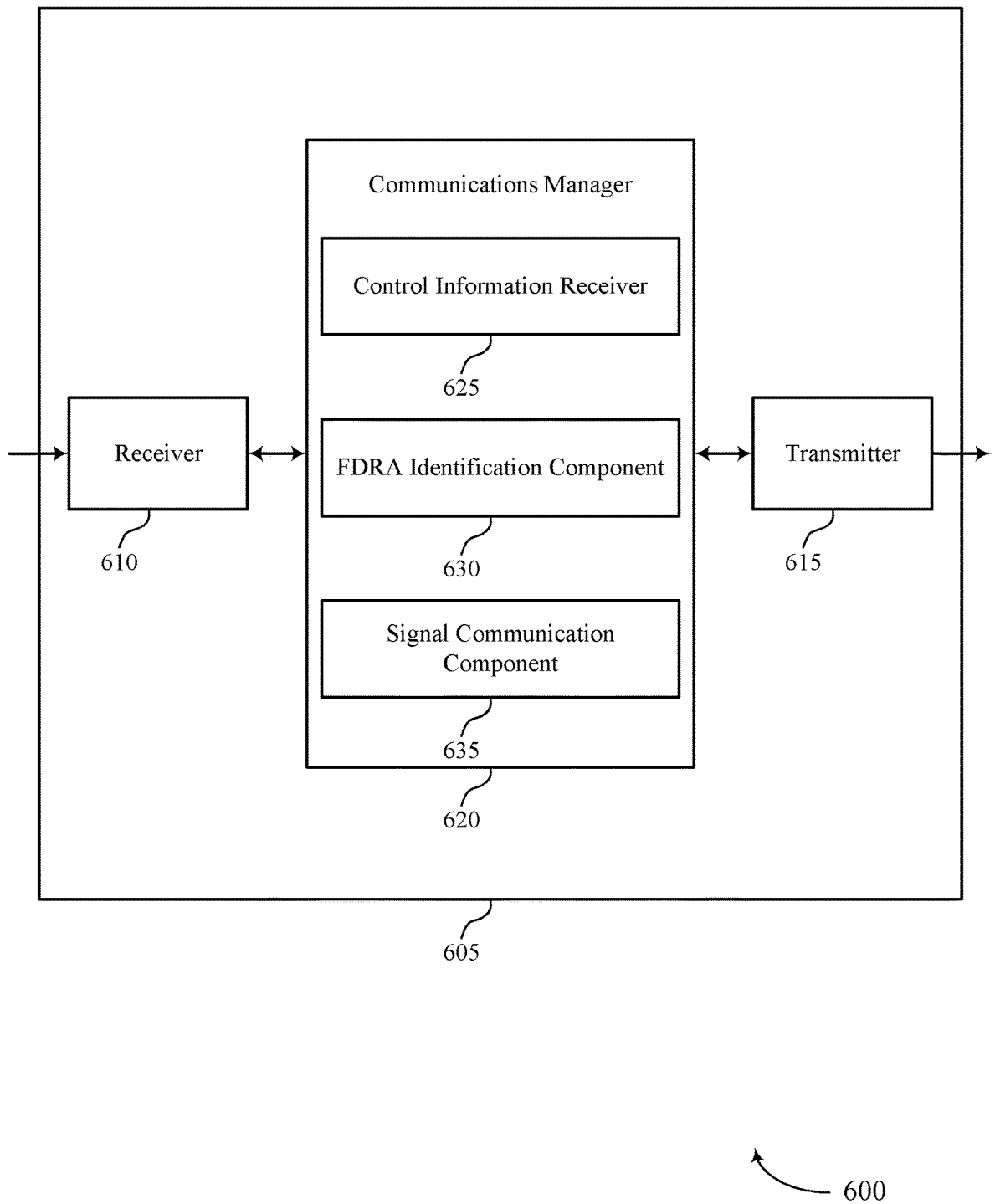

FIG. 6 shows a block diagram 600 of a device 605 that supports flexible FDRA for sidelink in accordance with aspects of the present disclosure. The device 605 may be an example of aspects of a device 505 or a receiving device (e.g., a UE, a base station, a sidelink enabled device, a wireless device as described with reference to FIGS. 2 through 4) as described herein. In some examples, the receiving device may be a transmitting device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to flexible FDRA for sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to flexible FDRA for sidelink). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of flexible FDRA for sidelink as described herein. For example, the communications manager 620 may include a control information receiver 625, an FDRA identification component 630, a signal communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a wireless device in accordance with examples as disclosed herein. The control information receiver 625 may be configured as or otherwise support a means for receiving, over a sidelink channel, control information including a parameter associated with a first FDRA of a first TB associated with an initial transmission and an indication of a second FDRA of a second TB associated with a subsequent transmission after the initial transmission. The FDRA identification component 630 may be configured as or otherwise support a means for identifying the first FDRA of the first TB based on receiving the control information that includes the parameter and the indication. The signal communication component 635 may be configured as or otherwise support a means for communicating, over the sidelink channel, one or more signals based on identifying the first FDRA of the first TB and receiving the indication of the second FDRA of the second TB.

Figure 7:
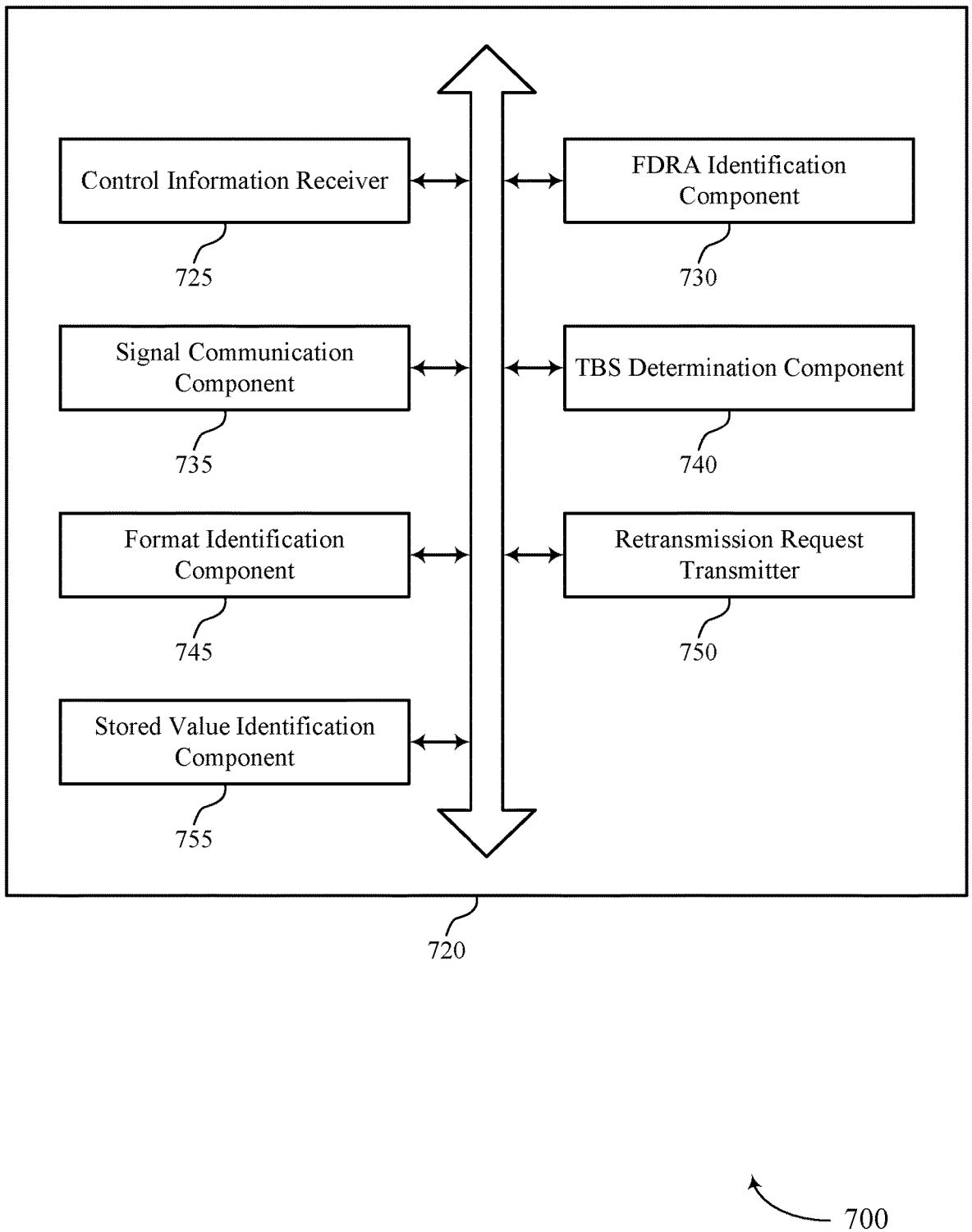
FIG. 7 shows a block diagram of a communications manager that supports flexible FDRA for sidelink in accordance with aspects of the present disclosure.

FIG. 7 shows a block diagram 700 of a communications manager 720 that supports flexible FDRA for sidelink in accordance with aspects of the present disclosure. The communications manager 720 may be an example of aspects of a communications manager 520, a communications manager 620, or both, as described herein. The communications manager 720, or various components thereof, may be an example of means for performing various aspects of flexible FDRA for sidelink as described herein. For example, the communications manager 720 may include a control information receiver 725, an FDRA identification component 730, a signal communication component 735, a TBS determination component 740, a format identification component 745, a retransmission request transmitter 750, a stored value identification component 755, or any combination thereof. Each of these components may communicate, directly or indirectly, with one another (e.g., via one or more buses).

The communications manager 720 may support wireless communications at a wireless device in accordance with examples as disclosed herein. The control information receiver 725 may be configured as or otherwise support a means for receiving, over a sidelink channel, control information including a parameter associated with a first FDRA of a first TB associated with an initial transmission and an indication of a second FDRA of a second TB associated with a subsequent transmission after the initial transmission. The FDRA identification component 730 may be configured as or otherwise support a means for identifying the first FDRA of the first TB based on receiving the control information that includes the parameter and the indication. The signal communication component 735 may be configured as or otherwise support a means for communicating, over the sidelink channel, one or more signals based on identifying the first FDRA of the first TB and receiving the indication of the second FDRA of the second TB.

In some examples, to support identifying the first FDRA, the FDRA identification component 730 may be configured as or otherwise support a means for applying a scaling factor to the second FDRA, where the parameter associated with the first FDRA of the first TB includes the scaling factor.

In some examples, to support identifying the first FDRA, the FDRA identification component 730 may be configured as or otherwise support a means for combining an adjustment factor with the second FDRA, where the parameter associated with the first FDRA of the first TB includes the adjustment factor.

In some examples, the parameter includes a second indication of the first FDRA of the first TB. In some examples, identifying the first FDRA is based on the second indication included in the control information. In some examples, the parameter includes an index associated with stored values of the first FDRA of the first TB.

In some examples, the stored value identification component 755 may be configured as or otherwise support a means for identifying a stored value of the stored values that is associated with the index based on receiving the index, where identifying the first FDRA is based on the stored value. In some examples, the stored values include one or more frequency domain resources, one or more scaling factors, or one or more adjustment factors associated with the first FDRA.

In some examples, the control information includes a second indication including an index associated with stored values of the first FDRA of the first TB and with stored values of the second FDRA for the second TB. In some examples, the indication of the second FDRA of the second TB includes an indication of a leading subchannel.

In some examples, the control information receiver 725 may be configured as or otherwise support a means for receiving, over a second sidelink channel, second control information including a second parameter associated with a size of the second TB. In some examples, the TBS determination component 740 may be configured as or otherwise support a means for determining the size of the second TB based on receiving the second control information.

In some examples, to support determining the size of the second TB, the TBS determination component 740 may be configured as or otherwise support a means for identifying, within the second control information, CBG information associated with the first TB, where the size of the second TB is based on the CBG information.

In some examples, to support determining the size of the second TB, the TBS determination component 740 may be configured as or otherwise support a means for applying a scaling factor to a size of the first TB, where the second parameter includes the scaling factor.

In some examples, to support determining the size of the second TB, the TBS determination component 740 may be configured as or otherwise support a means for combining an adjustment factor with a size of the first TB, where the second parameter includes the adjustment factor.

In some examples, to support determining the size of the second TB, the stored value identification component 755 may be configured as or otherwise support a means for identifying a stored value associated with the second index and corresponding to the size of the second TB.

In some examples, to support determining the size of the second TB, the TBS determination component 740 may be configured as or otherwise support a means for identifying, within the second control information, a bit field indicating the size of the second TB.

In some examples, the format identification component 745 may be configured as or otherwise support a means for identifying a format associated with the control information, where identifying the first FDRA of the first TB is based on the format associated with the control information. In some examples, the control information includes SCI.

In some examples, the retransmission request transmitter 750 may be configured as or otherwise support a means for transmitting, to a second wireless device over the sidelink channel, a request to retransmit a portion of the first TB, where the second TB includes the portion of the first TB.

In some examples, the request to retransmit the portion of the first TB includes an indication of an amount of frequency domain resources for the second TB. In some examples, the control information is associated with a CG for sidelink communications. In some examples, the control information is communicated over a physical sidelink control channel and the first TB and the second TB are communicated over a physical sidelink shared channel.

Figure 8:
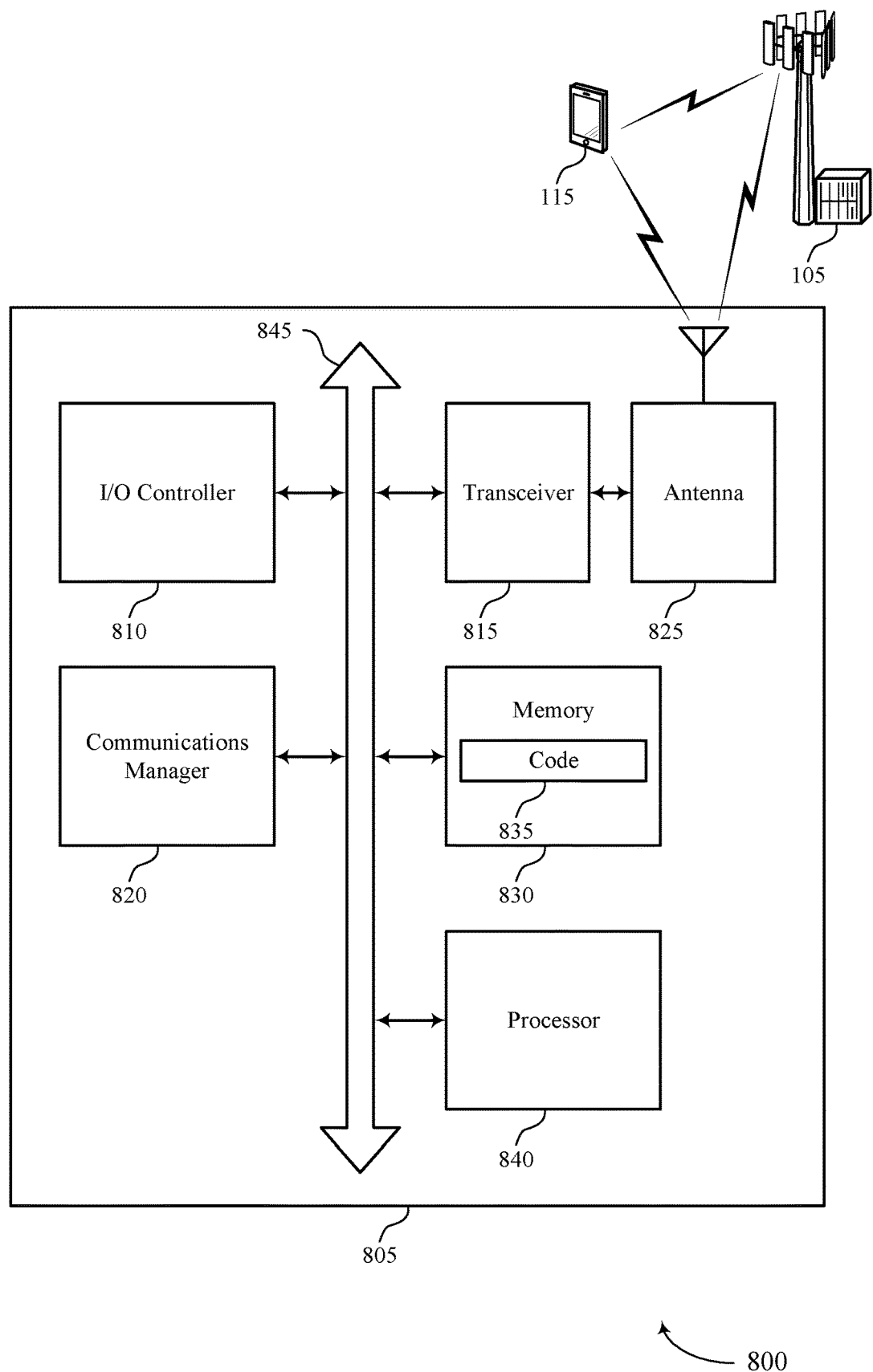
FIG. 8 shows a diagram of a system including a device that supports flexible FDRA for sidelink in accordance with aspects of the present disclosure.

FIG. 8 shows a diagram of a system 800 including a device 805 that supports flexible FDRA for sidelink in accordance with aspects of the present disclosure. The device 805 may be an example of or include the components of a device 505, a device 605, or a receiving device (e.g., a UE, a base station, a sidelink enabled device, a wireless device as described with reference to FIGS. 2 through 4) as described herein. In some examples, the receiving device may be a transmitting device as described herein. The device 805 may include components for bi-directional voice and data communications including components for transmitting and receiving communications, such as a communications manager 820, an I/O controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting flexible FDRA for sidelink). For example, the device 805 or a component of the device 805 may include a processor 840 and memory 830 coupled to the processor 840, the processor 840 and memory 830 configured to perform various functions described herein.

The communications manager 820 may support wireless communications at a wireless device in accordance with examples as disclosed herein. For example, the communications manager 820 may be configured as or otherwise support a means for receiving, over a sidelink channel, control information including a parameter associated with a first FDRA of a first TB associated with an initial transmission and an indication of a second FDRA of a second TB associated with a subsequent transmission after the initial transmission. The communications manager 820 may be configured as or otherwise support a means for identifying the first FDRA of the first TB based on receiving the control information that includes the parameter and the indication. The communications manager 820 may be configured as or otherwise support a means for communicating, over the sidelink channel, one or more signals based on identifying the first FDRA of the first TB and receiving the indication of the second FDRA of the second TB.

By including or configuring the communications manager 820 in accordance with examples as described herein, the device 805 may support techniques for receiving control information supporting flexible FDRA, resulting in reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of flexible FDRA for sidelink as described herein, or the processor 840 and the memory 830 may be otherwise configured to perform or support such operations.

Figure 9:
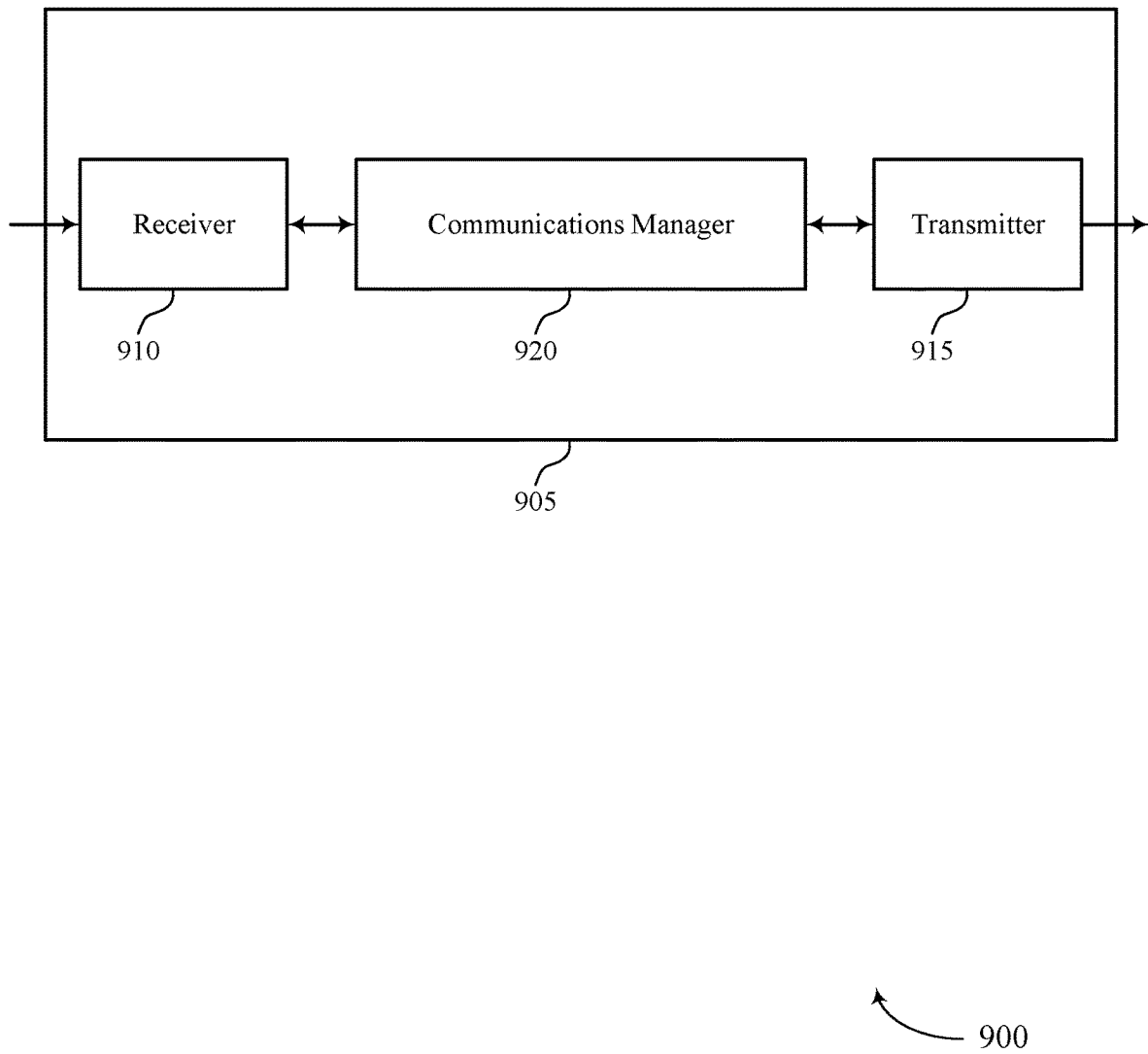
FIGS. 9 and 10 show block diagrams of devices that support flexible FDRA for sidelink in accordance with aspects of the present disclosure.

FIG. 9 shows a block diagram 900 of a device 905 that supports flexible FDRA for sidelink in accordance with aspects of the present disclosure. The device 905 may be an example of aspects of a wireless device, such as a transmitting device (e.g., a UE, a base station, a sidelink enabled device, a wireless device as described with reference to FIGS. 2 through 4) as described herein. In some examples, the transmitting device may be a receiving device as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to flexible FDRA for sidelink). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to flexible FDRA for sidelink). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of flexible FDRA for sidelink as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a wireless device in accordance with examples as disclosed herein. For example, the communications manager 920 may be configured as or otherwise support a means for identifying a first FDRA of a first TB associated with an initial transmission. The communications manager 920 may be configured as or otherwise support a means for identifying a second FDRA of a second TB associated with a subsequent transmission, where identifying the first FDRA is based on identifying the second FDRA of the second TB. The communications manager 920 may be configured as or otherwise support a means for transmitting, over a sidelink channel, control information including a parameter associated with the first FDRA and an indication of the second FDRA. The communications manager 920 may be configured as or otherwise support a means for communicating, over the sidelink channel, one or more signals based on identifying the first FDRA of the first TB and identifying the second FDRA of the second TB.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for transmitting control information supporting flexible FDRA, resulting in more efficient utilization of communication resources, reduced power usage, and diminished extraneous signal processing.

Figure 10:
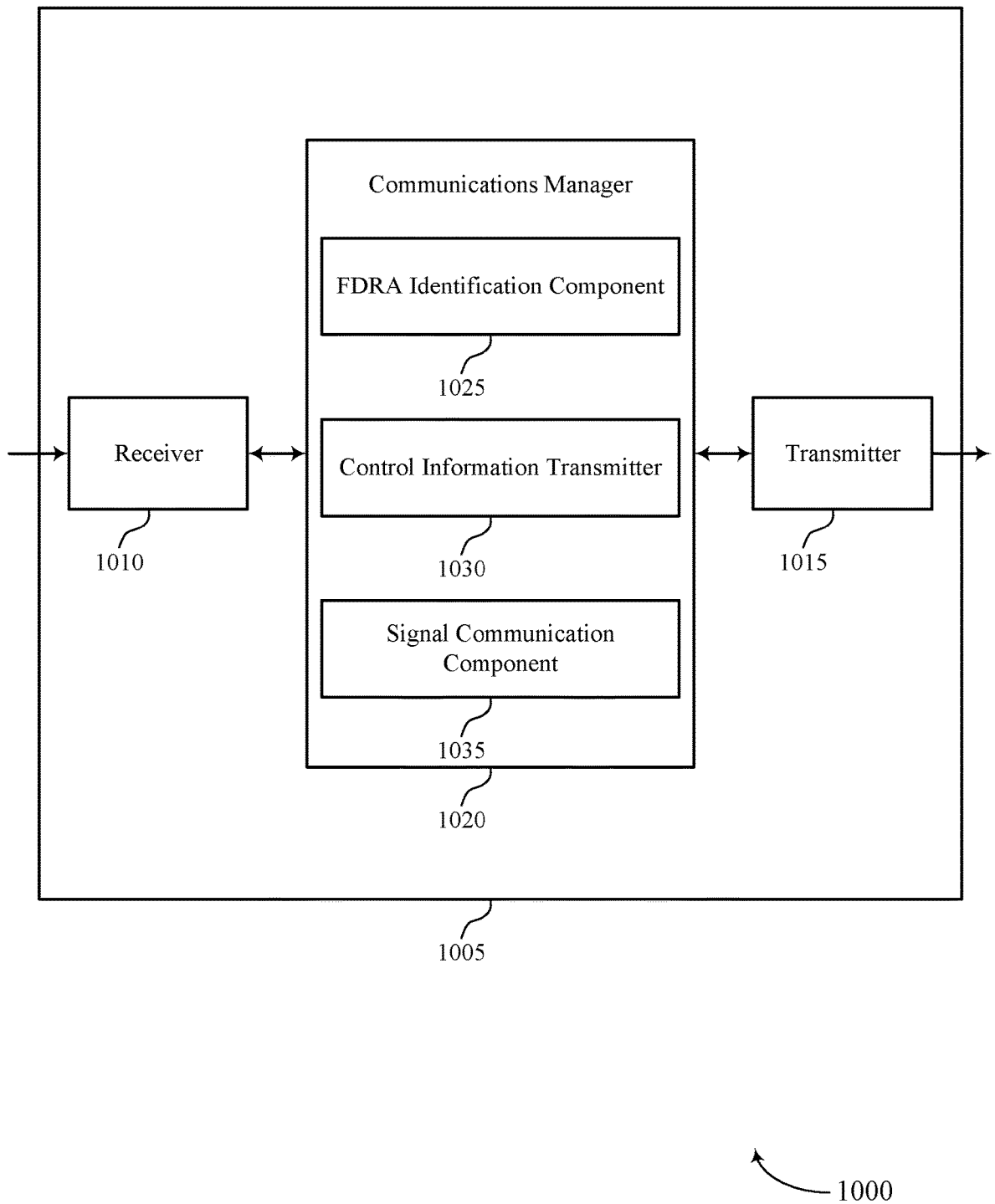

FIG. 10 shows a block diagram 1000 of a device 1005 that supports flexible FDRA for sidelink in accordance with aspects of the present disclosure. The device 1005 may be an example of aspects of a device 905 or a transmitting device (e.g., a UE, a base station, a sidelink enabled device, a wireless device as described with reference to FIGS. 2 through 4) as described herein. In some examples, the transmitting device may be a receiving device as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to flexible FDRA for sidelink). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to flexible FDRA for sidelink). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of flexible FDRA for sidelink as described herein. For example, the communications manager 1020 may include an FDRA identification component 1025, a control information transmitter 1030, a signal communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a wireless device in accordance with examples as disclosed herein. The FDRA identification component 1025 may be configured as or otherwise support a means for identifying a first FDRA of a first TB associated with an initial transmission. The FDRA identification component 1025 may be configured as or otherwise support a means for identifying a second FDRA of a second TB associated with a subsequent transmission, where identifying the first FDRA is based on identifying the second FDRA of the second TB. The control information transmitter 1030 may be configured as or otherwise support a means for transmitting, over a sidelink channel, control information including a parameter associated with the first FDRA and an indication of the second FDRA. The signal communication component 1035 may be configured as or otherwise support a means for communicating, over the sidelink channel, one or more signals based on identifying the first FDRA of the first TB and identifying the second FDRA of the second TB.

Figure 11:
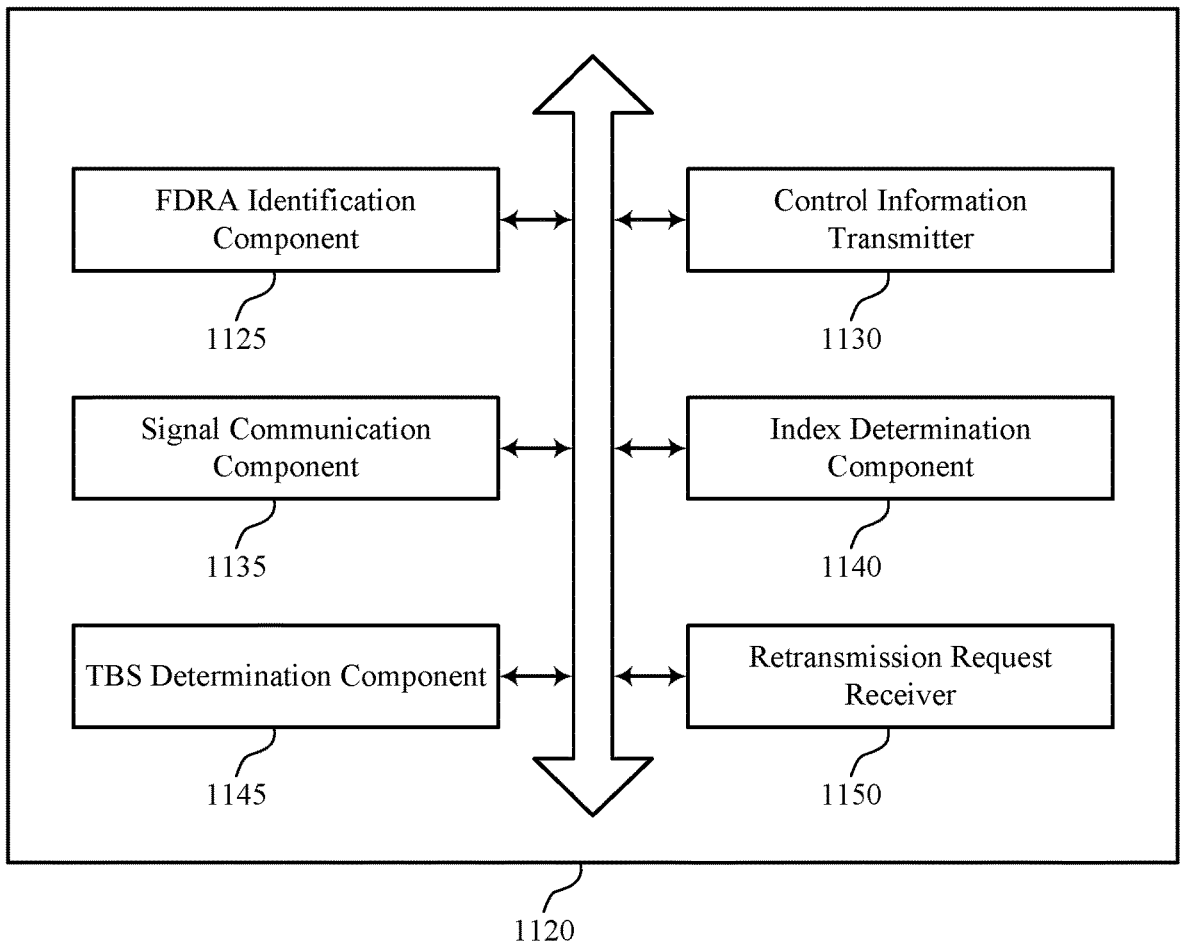
FIG. 11 shows a block diagram of a communications manager that supports flexible FDRA for sidelink in accordance with aspects of the present disclosure.

FIG. 11 shows a block diagram 1100 of a communications manager 1120 that supports flexible FDRA for sidelink in accordance with aspects of the present disclosure. The communications manager 1120 may be an example of aspects of a communications manager 920, a communications manager 1020, or both, as described herein. The communications manager 1120, or various components thereof, may be an example of means for performing various aspects of flexible FDRA for sidelink as described herein. For example, the communications manager 1120 may include an FDRA identification component 1125, a control information transmitter 1130, a signal communication component 1135, an index determination component 1140, a TBS determination component 1145, a retransmission request receiver 1150, a stored value identification component 1155, or any combination thereof. Each of these components may communicate, directly or indirectly, with one another (e.g., via one or more buses).

The communications manager 1120 may support wireless communications at a wireless device in accordance with examples as disclosed herein. The FDRA identification component 1125 may be configured as or otherwise support a means for identifying a first FDRA of a first TB associated with an initial transmission. In some examples, the FDRA identification component 1125 may be configured as or otherwise support a means for identifying a second FDRA of a second TB associated with a subsequent transmission, where identifying the first FDRA is based on identifying the second FDRA of the second TB. The control information transmitter 1130 may be configured as or otherwise support a means for transmitting, over a sidelink channel, control information including a parameter associated with the first FDRA and an indication of the second FDRA. The signal communication component 1135 may be configured as or otherwise support a means for communicating, over the sidelink channel, one or more signals based on identifying the first FDRA of the first TB and identifying the second FDRA of the second TB.

In some examples, to support transmitting the control information, the control information transmitter 1130 may be configured as or otherwise support a means for transmitting the control information including a scaling factor, where the parameter includes the scaling factor.

In some examples, to support transmitting the control information, the control information transmitter 1130 may be configured as or otherwise support a means for transmitting the control information including an adjustment factor, where the parameter includes the adjustment factor. In some examples, the parameter includes a second indication of the first FDRA of the first TB.

In some examples, the index determination component 1140 may be configured as or otherwise support a means for determining an index associated with stored values of the first FDRA of the first TB, where the parameter includes the index. In some examples, the stored values include one or more frequency domain resources, one or more scaling factors, or one or more adjustment factors associated with the first FDRA.

In some examples, to support transmitting the control information, the control information transmitter 1130 may be configured as or otherwise support a means for transmitting the control information including a second indication including an index associated with stored values of the first FDRA of the first TB and with stored values of the second FDRA for the second TB. In some examples, the indication of the second FDRA of the second TB includes an indication of a leading subchannel.

In some examples, the TBS determination component 1145 may be configured as or otherwise support a means for determining a size of the second TB. In some examples, the control information transmitter 1130 may be configured as or otherwise support a means for transmitting, over a second sidelink channel, second control information including a second parameter associated with the size of the second TB.

In some examples, to support transmitting the second control information, the control information transmitter 1130 may be configured as or otherwise support a means for transmitting, within the second control information, CBG information associated with the first TB, where the size of the second TB is based on the CBG information.

In some examples, to support transmitting the second control information, the control information transmitter 1130 may be configured as or otherwise support a means for transmitting the second control information including a scaling factor, where the second parameter includes the scaling factor.

In some examples, to support transmitting the second control information, the control information transmitter 1130 may be configured as or otherwise support a means for transmitting the second control information including an adjustment factor, where the second parameter includes the adjustment factor.

In some examples, to support determining the size of the second TB, the stored value identification component 1155 may be configured as or otherwise support a means for identifying a stored value associated with the second index and corresponding to the size of the second TB.

In some examples, to support transmitting the second control information, the control information transmitter 1130 may be configured as or otherwise support a means for transmitting the second control information including a bit field indicating the size of the second TB.

In some examples, the control information corresponds to a format. In some examples, the first FDRA of the first TB is based on the format of the control information. In some examples, the control information includes SCI.

In some examples, the retransmission request receiver 1150 may be configured as or otherwise support a means for receiving, from a second wireless device over the sidelink channel, a request to retransmit a portion of the first TB, where the second TB includes the portion of the first TB.

In some examples, the request to retransmit the portion of the first TB includes an indication of an amount of frequency domain resources for the second TB. In some examples, the control information is associated with a CG for sidelink communications.

In some examples, the control information is communicated over a physical sidelink control channel and the first TB and the second TB are communicated over a physical sidelink shared channel.

Figure 12:
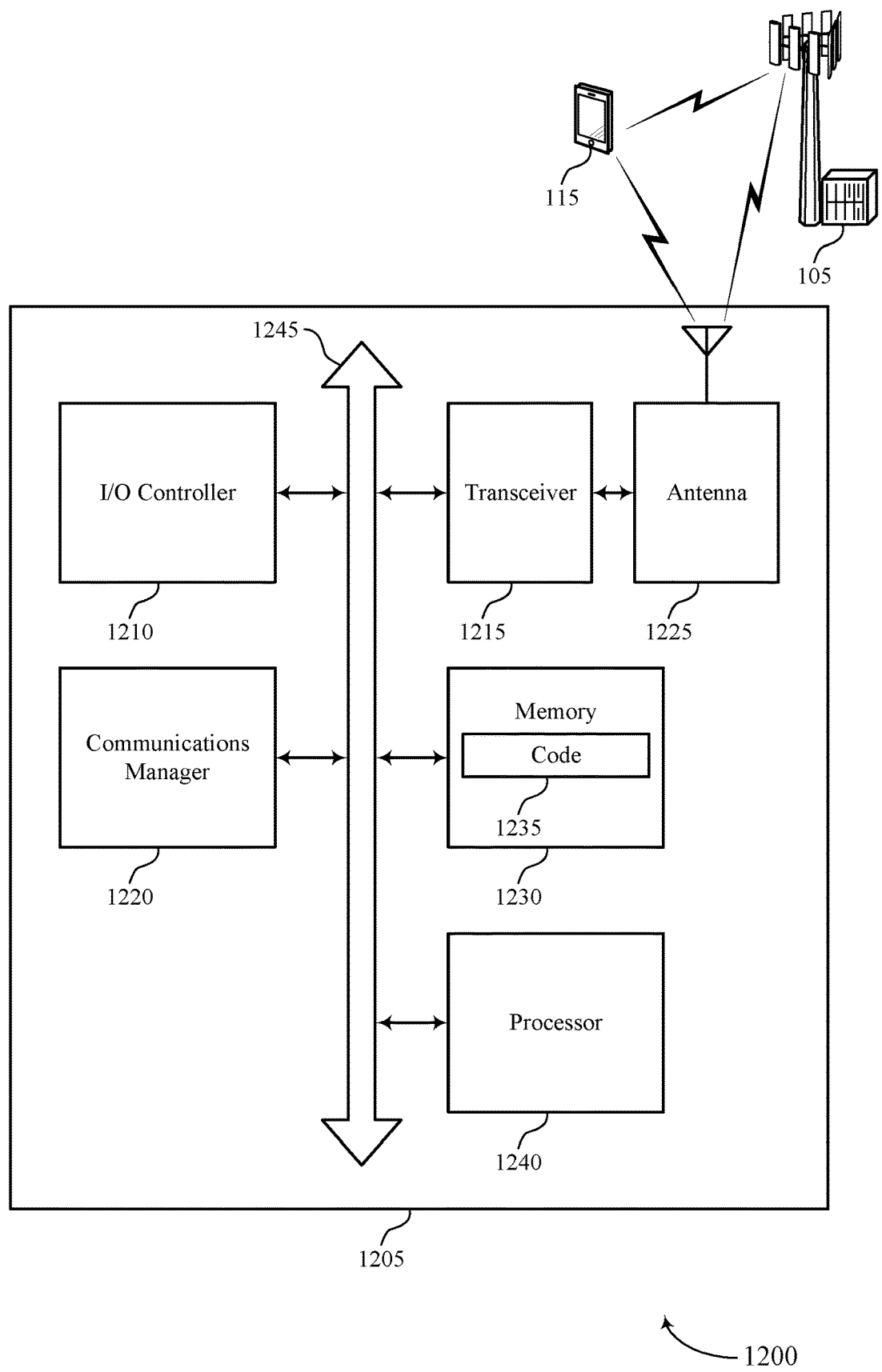
FIG. 12 shows a diagram of a system including a device that supports flexible FDRA for sidelink in accordance with aspects of the present disclosure.

FIG. 12 shows a diagram of a system 1200 including a device 1205 that supports flexible FDRA for sidelink in accordance with aspects of the present disclosure. The device 1205 may be an example of or include the components of a device 905, a device 1005, or a transmitting device (e.g., a UE, a base station, a sidelink enabled device, a wireless device as described with reference to FIGS. 2 through 4) as described herein. In some examples, the transmitting device may be a receiving device as described herein. The device 1205 may include components for bi-directional voice and data communications including components for transmitting and receiving communications, such as a communications manager 1220, a I/O controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting flexible FDRA for sidelink). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a wireless device in accordance with examples as disclosed herein. For example, the communications manager 1220 may be configured as or otherwise support a means for identifying a first FDRA of a first TB associated with an initial transmission. The communications manager 1220 may be configured as or otherwise support a means for identifying a second FDRA of a second TB associated with a subsequent transmission, where identifying the first FDRA is based on identifying the second FDRA of the second TB. The communications manager 1220 may be configured as or otherwise support a means for transmitting, over a sidelink channel, control information including a parameter associated with the first FDRA and an indication of the second FDRA. The communications manager 1220 may be configured as or otherwise support a means for communicating, over the sidelink channel, one or more signals based on identifying the first FDRA of the first TB and identifying the second FDRA of the second TB.

By including or configuring the communications manager 1220 in accordance with examples as described herein, the device 1205 may support techniques for transmitting control information supporting flexible FDRA, resulting in reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of flexible FDRA for sidelink as described herein, or the processor 1240 and the memory 1230 may be otherwise configured to perform or support such operations.

Figure 13:
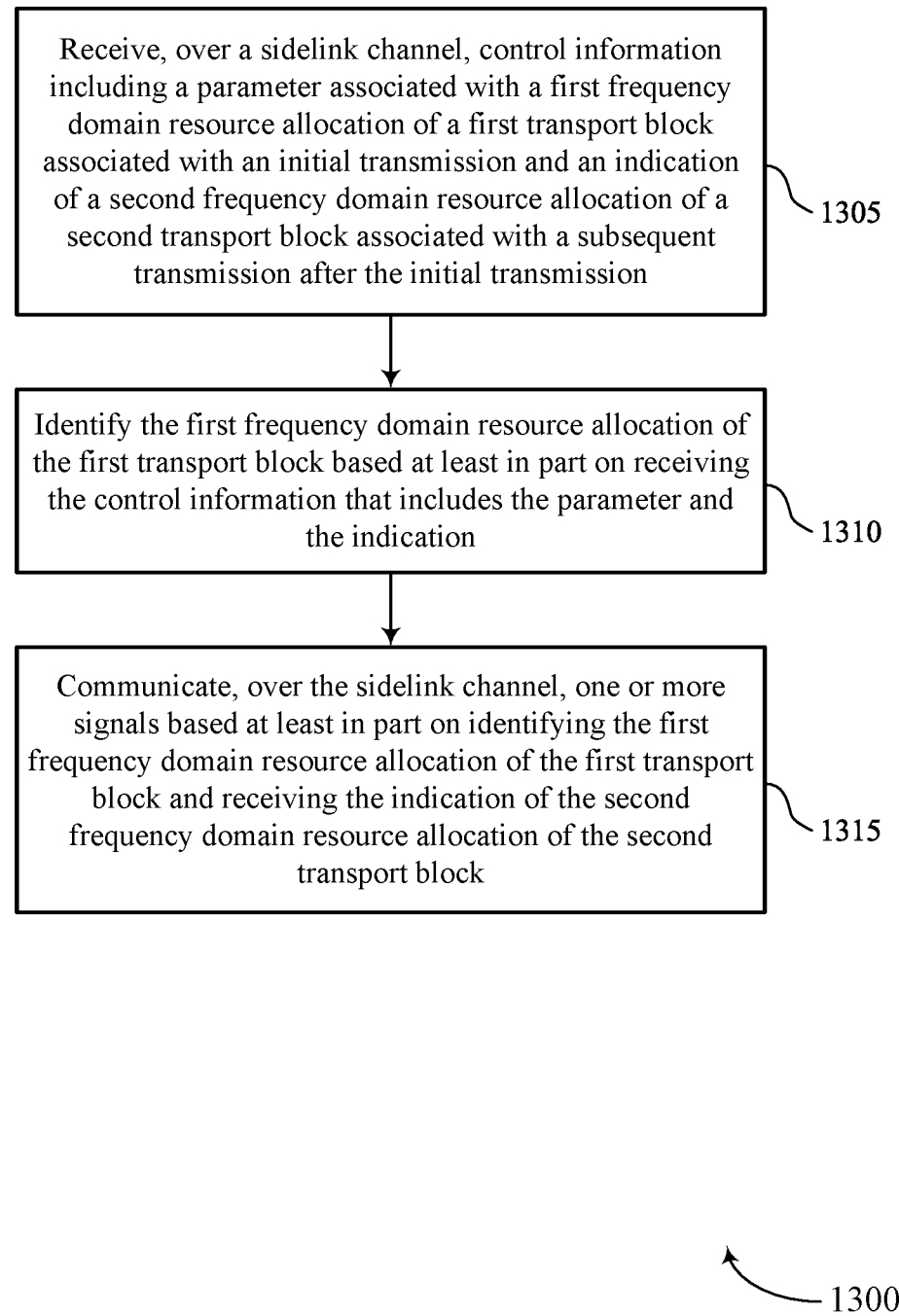
FIGS. 13 through 16 show flowcharts illustrating methods that support flexible FDRA for sidelink in accordance with aspects of the present disclosure.

FIG. 13 shows a flowchart illustrating a method 1300 that supports flexible FDRA for sidelink in accordance with aspects of the present disclosure. The operations of the method 1300 may be implemented by a wireless device, such as a receiving device (e.g., a UE, a base station, a sidelink enabled device, a wireless device as described with reference to FIG. 2 through 4) or its components as described herein. For example, the operations of the method 1300 may be performed by a receiving device as described with reference to FIGS. 1 through 8. In some examples, the receiving device may be a transmitting device as described herein. In some examples, a receiving device may execute a set of instructions to control the functional elements of the receiving device to perform the described functions. Additionally or alternatively, the receiving device may perform aspects of the described functions using special-purpose hardware.

At 1305, the method may include receiving, over a sidelink channel, control information including a parameter associated with a first FDRA of a first TB associated with an initial transmission and an indication of a second FDRA of a second TB associated with a subsequent transmission after the initial transmission. The operations of 1305 may be performed in accordance with examples as disclosed herein. In some examples, aspects of the operations of 1305 may be performed by a control information receiver 725 as described with reference to FIG. 7.

At 1310, the method may include identifying the first FDRA of the first TB based on receiving the control information that includes the parameter and the indication. The operations of 1310 may be performed in accordance with examples as disclosed herein. In some examples, aspects of the operations of 1310 may be performed by an FDRA identification component 730 as described with reference to FIG. 7.

At 1315, the method may include communicating, over the sidelink channel, one or more signals based on identifying the first FDRA of the first TB and receiving the indication of the second FDRA of the second TB. The operations of 1315 may be performed in accordance with examples as disclosed herein. In some examples, aspects of the operations of 1315 may be performed by a signal communication component 735 as described with reference to FIG. 7.

Figure 14:
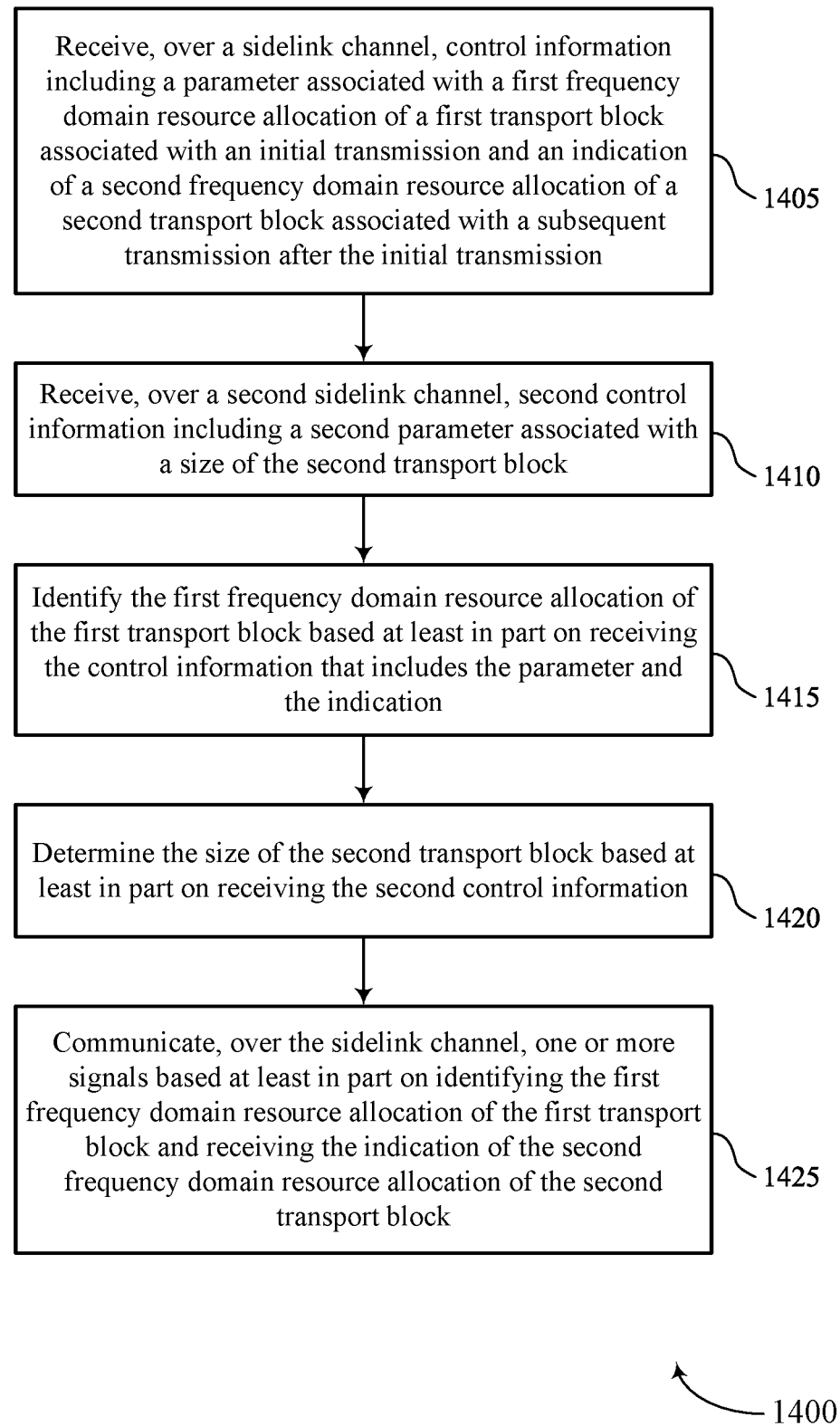

FIG. 14 shows a flowchart illustrating a method 1400 that supports flexible FDRA for sidelink in accordance with aspects of the present disclosure. The operations of the method 1400 may be implemented by a wireless device, such as a receiving device (e.g., a UE, a base station, a sidelink enabled device, a wireless device as described with reference to FIG. 2 through 4) or its components as described herein. For example, the operations of the method 1400 may be performed by a receiving device as described with reference to FIGS. 1 through 8. In some examples, the receiving device may be a transmitting device as described herein. In some examples, a receiving device may execute a set of instructions to control the functional elements of the receiving device to perform the described functions. Additionally or alternatively, the receiving device may perform aspects of the described functions using special-purpose hardware.

At 1405, the method may include receiving, over a sidelink channel, control information including a parameter associated with a first FDRA of a first TB associated with an initial transmission and an indication of a second FDRA of a second TB associated with a subsequent transmission after the initial transmission. The operations of 1405 may be performed in accordance with examples as disclosed herein. In some examples, aspects of the operations of 1405 may be performed by a control information receiver 725 as described with reference to FIG. 7.

At 1410, the method may include identifying the first FDRA of the first TB based on receiving the control information that includes the parameter and the indication. The operations of 1410 may be performed in accordance with examples as disclosed herein. In some examples, aspects of the operations of 1410 may be performed by an FDRA identification component 730 as described with reference to FIG. 7.

At 1415, the method may include communicating, over the sidelink channel, one or more signals based on identifying the first FDRA of the first TB and receiving the indication of the second FDRA of the second TB. The operations of 1415 may be performed in accordance with examples as disclosed herein. In some examples, aspects of the operations of 1415 may be performed by a signal communication component 735 as described with reference to FIG. 7.

At 1420, the method may include receiving, over a second sidelink channel, second control information including a second parameter associated with a size of the second TB. The operations of 1420 may be performed in accordance with examples as disclosed herein. In some examples, aspects of the operations of 1420 may be performed by a control information receiver 725 as described with reference to FIG. 7.

At 1425, the method may include determining the size of the second TB based on receiving the second control information. The operations of 1425 may be performed in accordance with examples as disclosed herein. In some examples, aspects of the operations of 1425 may be performed by a TBS determination component 740 as described with reference to FIG. 7.

Figure 15:
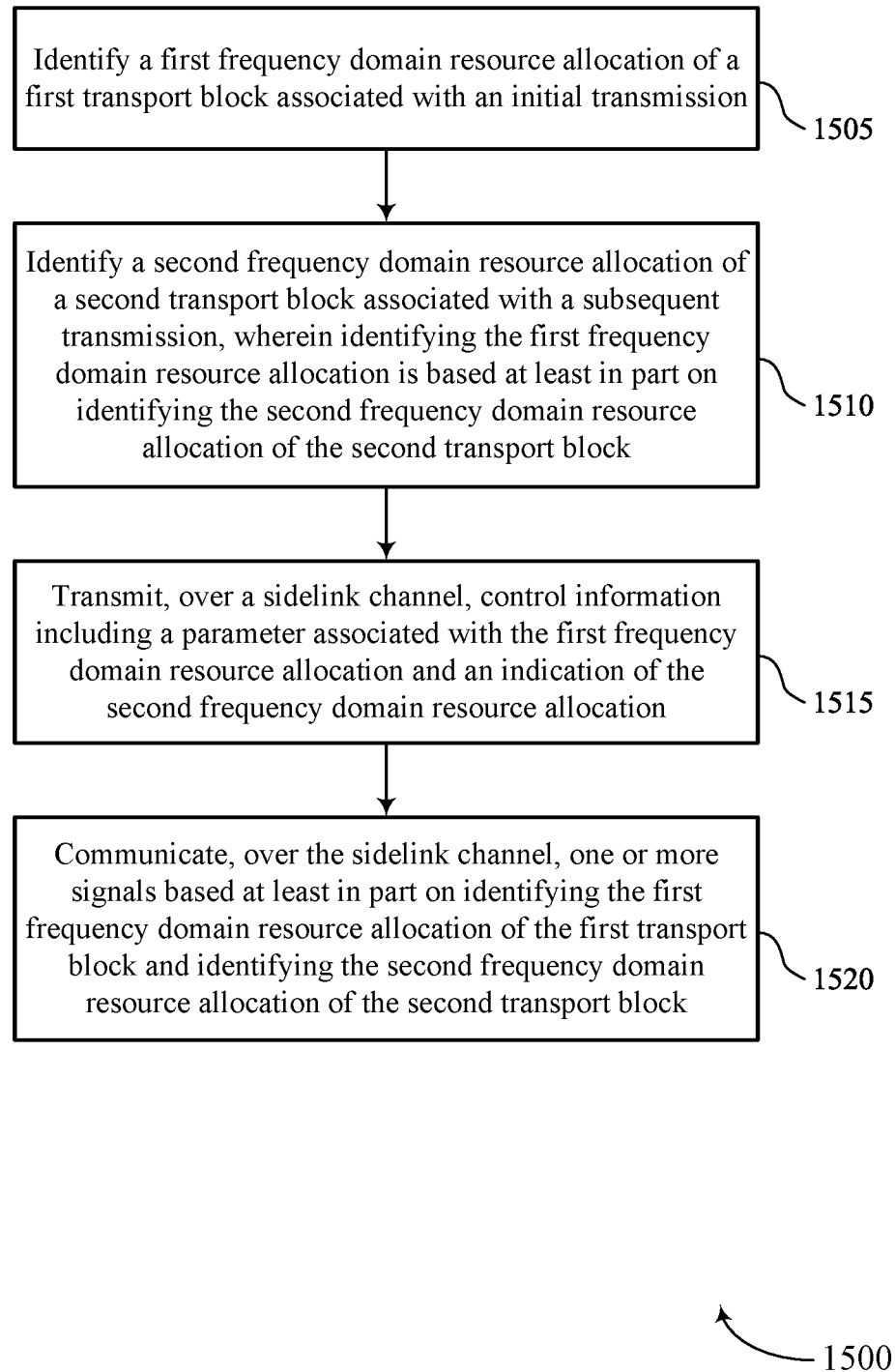

FIG. 15 shows a flowchart illustrating a method 1500 that supports flexible FDRA for sidelink in accordance with aspects of the present disclosure. The operations of the method 1500 may be implemented by a wireless device, such as a transmitting device (e.g., a UE, a base station, a sidelink enabled device, a wireless device as described with reference to FIG. 2 through 4) or its components as described herein. For example, the operations of the method 1500 may be performed by a transmitting device as described with reference to FIGS. 1 through 4 and 9 through 12. In some examples, the transmitting device may be a receiving device as described herein. In some examples, a transmitting device may execute a set of instructions to control the functional elements of the transmitting device to perform the described functions. Additionally or alternatively, the transmitting device may perform aspects of the described functions using special-purpose hardware.

At 1505, the method may include identifying a first FDRA of a first TB associated with an initial transmission. The operations of 1505 may be performed in accordance with examples as disclosed herein. In some examples, aspects of the operations of 1505 may be performed by an FDRA identification component 1125 as described with reference to FIG. 11.

At 1510, the method may include identifying a second FDRA of a second TB associated with a subsequent transmission, where identifying the first FDRA is based on identifying the second FDRA of the second TB. The operations of 1510 may be performed in accordance with examples as disclosed herein. In some examples, aspects of the operations of 1510 may be performed by an FDRA identification component 1125 as described with reference to FIG. 11.

At 1515, the method may include transmitting, over a sidelink channel, control information including a parameter associated with the first FDRA and an indication of the second FDRA. The operations of 1515 may be performed in accordance with examples as disclosed herein. In some examples, aspects of the operations of 1515 may be performed by a control information transmitter 1130 as described with reference to FIG. 11.

At 1520, the method may include communicating, over the sidelink channel, one or more signals based on identifying the first FDRA of the first TB and identifying the second FDRA of the second TB. The operations of 1520 may be performed in accordance with examples as disclosed herein. In some examples, aspects of the operations of 1520 may be performed by a signal communication component 1135 as described with reference to FIG. 11.

Figure 16:
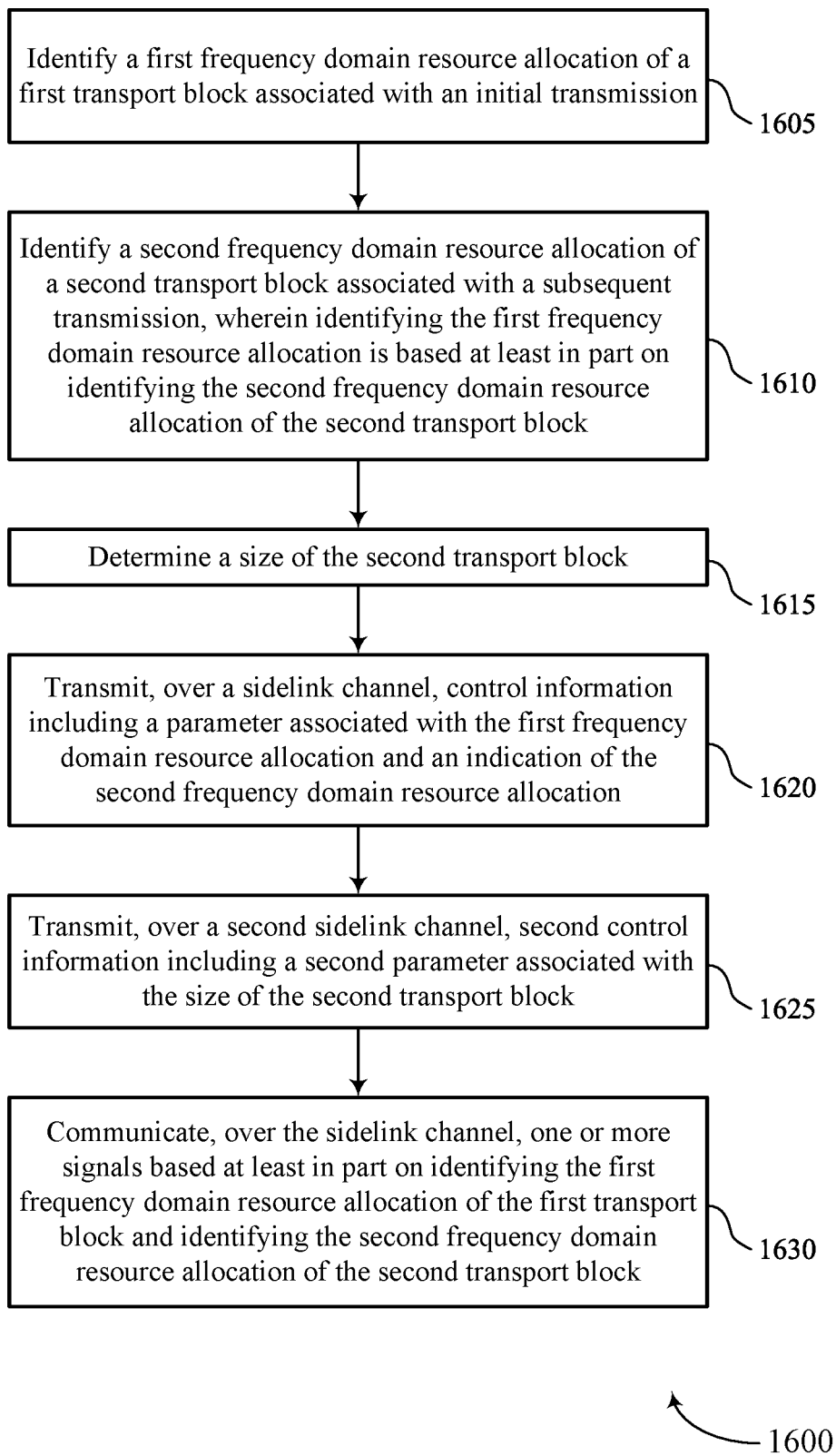

FIG. 16 shows a flowchart illustrating a method 1600 that supports flexible FDRA for sidelink in accordance with aspects of the present disclosure. The operations of the method 1600 may be implemented by a wireless device, such as a transmitting device (e.g., a UE, a base station, a sidelink enabled device, a wireless device as described with reference to FIG. 2 through 4) or its components as described herein. For example, the operations of the method 1600 may be performed by a transmitting device as described with reference to FIGS. 1 through 4 and 9 through 12. In some examples, the receiving device may be a receiving device as described herein. In some examples, a transmitting device may execute a set of instructions to control the functional elements of the transmitting device to perform the described functions. Additionally or alternatively, the transmitting device may perform aspects of the described functions using special-purpose hardware.

At 1605, the method may include identifying a first FDRA of a first TB associated with an initial transmission. The operations of 1605 may be performed in accordance with examples as disclosed herein. In some examples, aspects of the operations of 1605 may be performed by an FDRA identification component 1125 as described with reference to FIG. 11.

At 1610, the method may include identifying a second FDRA of a second TB associated with a subsequent transmission, where identifying the first FDRA is based on identifying the second FDRA of the second TB. The operations of 1610 may be performed in accordance with examples as disclosed herein. In some examples, aspects of the operations of 1610 may be performed by an FDRA identification component 1125 as described with reference to FIG. 11.

At 1615, the method may include transmitting, over a sidelink channel, control information including a parameter associated with the first FDRA and an indication of the second FDRA. The operations of 1615 may be performed in accordance with examples as disclosed herein. In some examples, aspects of the operations of 1615 may be performed by a control information transmitter 1130 as described with reference to FIG. 11.

At 1620, the method may include communicating, over the sidelink channel, one or more signals based on identifying the first FDRA of the first TB and identifying the second FDRA of the second TB. The operations of 1620 may be performed in accordance with examples as disclosed herein. In some examples, aspects of the operations of 1620 may be performed by a signal communication component 1135 as described with reference to FIG. 11.

At 1625, the method may include determining a size of the second TB. The operations of 1625 may be performed in accordance with examples as disclosed herein. In some examples, aspects of the operations of 1625 may be performed by a TBS determination component 1145 as described with reference to FIG. 11.

At 1630, the method may include transmitting, over a second sidelink channel, second control information including a second parameter associated with the size of the second TB. The operations of 1630 may be performed in accordance with examples as disclosed herein. In some examples, aspects of the operations of 1630 may be performed by a control information transmitter 1130 as described with reference to FIG. 11.

The following provides an overview of aspects of the present disclosure:

Aspect 1: A method for wireless communications at a wireless device, comprising: receiving, over a sidelink channel, control information including a parameter associated with a first frequency domain resource allocation of a first transport block associated with an initial transmission and an indication of a second frequency domain resource allocation of a second transport block associated with a subsequent transmission after the initial transmission; identifying the first frequency domain resource allocation of the first transport block based at least in part on receiving the control information that includes the parameter and the indication; and communicating, over the sidelink channel, one or more signals based at least in part on identifying the first frequency domain resource allocation of the first transport block and receiving the indication of the second frequency domain resource allocation of the second transport block.

Aspect 2: The method of aspect 1, wherein identifying the first frequency domain resource allocation further comprises: applying a scaling factor to the second frequency domain resource allocation, wherein the parameter associated with the first frequency domain resource allocation of the first transport block comprises the scaling factor.

Aspect 3: The method of any of aspects 1 through 2, wherein identifying the first frequency domain resource allocation further comprises: combining an adjustment factor with the second frequency domain resource allocation, wherein the parameter associated with the first frequency domain resource allocation of the first transport block comprises the adjustment factor.

Aspect 4: The method of any of aspects 1 through 3, wherein the parameter comprises a second indication of the first frequency domain resource allocation of the first transport block, identifying the first frequency domain resource allocation is based at least in part on the second indication included in the control information.

Aspect 5: The method of any of aspects 1 through 4, wherein the parameter comprises an index associated with stored values of the first frequency domain resource allocation of the first transport block.

Aspect 6: The method of aspect 5, further comprising: identifying a stored value of the stored values that is associated with the index based at least in part on receiving the index, wherein identifying the first frequency domain resource allocation is based at least in part on the stored value.

Aspect 7: The method of aspect 6, wherein the stored values include one or more frequency domain resources, one or more scaling factors, or one or more adjustment factors associated with the first frequency domain resource allocation.

Aspect 8: The method of any of aspects 1 through 7, wherein the control information includes a second indication comprising an index associated with stored values of the first frequency domain resource allocation of the first transport block and with stored values of the second frequency domain resource allocation for the second transport block.

Aspect 9: The method of any of aspects 1 through 8, wherein the indication of the second frequency domain resource allocation of the second transport block comprises an indication of a leading subchannel.

Aspect 10: The method of any of aspects 1 through 9, further comprising: receiving, over a second sidelink channel, second control information including a second parameter associated with a size of the second transport block; and determining the size of the second transport block based at least in part on receiving the second control information.

Aspect 11: The method of aspect 10, wherein determining the size of the second transport block further comprises: identifying, within the second control information, code block group information associated with the first transport block, wherein the size of the second transport block is based at least in part on the code block group information.

Aspect 12: The method of any of aspects 10 through 11, wherein determining the size of the second transport block further comprises: applying a scaling factor to a size of the first transport block, wherein the second parameter comprises the scaling factor.

Aspect 13: The method of any of aspects 10 through 12, wherein determining the size of the second transport block further comprises: combining an adjustment factor with a size of the first transport block, wherein the second parameter comprises the adjustment factor.

Aspect 14: The method of any of aspects 10 through 13, wherein the second parameter comprises a second index associated with stored values associated with transport block size and wherein determining the size of the second transport block further comprises: identifying a stored value associated with the second index and corresponding to the size of the second transport block.

Aspect 15: The method of any of aspects 10 through 14, wherein determining the size of the second transport block further comprises: identifying, within the second control information, a bit field indicating the size of the second transport block.

Aspect 16: The method of any of aspects 1 through 15, further comprising: identifying a format associated with the control information, wherein identifying the first frequency domain resource allocation of the first transport block is based at least in part on the format associated with the control information.

Aspect 17: The method of aspect 16, wherein the control information comprises sidelink control information.

Aspect 18: The method of any of aspects 1 through 17, further comprising: transmitting, to a second wireless device over the sidelink channel, a request to retransmit a portion of the first transport block, wherein the second transport block comprises the portion of the first transport block.

Aspect 19: The method of aspect 18, wherein the request to retransmit the portion of the first transport block comprises an indication of an amount of frequency domain resources for the second transport block.

Aspect 20: The method of any of aspects 1 through 19, wherein the control information is associated with a configured grant for sidelink communications.

Aspect 21: The method of any of aspects 1 through 20, wherein the control information is communicated over a physical sidelink control channel and the first transport block and the second transport block are communicated over a physical sidelink shared channel.

Aspect 22: A method for wireless communications at a wireless device, comprising: identifying a first frequency domain resource allocation of a first transport block associated with an initial transmission; identifying a second frequency domain resource allocation of a second transport block associated with a subsequent transmission, wherein identifying the first frequency domain resource allocation is based at least in part on identifying the second frequency domain resource allocation of the second transport block; transmitting, over a sidelink channel, control information including a parameter associated with the first frequency domain resource allocation and an indication of the second frequency domain resource allocation; and communicating, over the sidelink channel, one or more signals based at least in part on identifying the first frequency domain resource allocation of the first transport block and identifying the second frequency domain resource allocation of the second transport block.

Aspect 23: The method of aspect 22, wherein transmitting the control information further comprises: transmitting the control information including a scaling factor, wherein the parameter comprises the scaling factor.

Aspect 24: The method of any of aspects 22 through 23, wherein transmitting the control information further comprises: transmitting the control information including an adjustment factor, wherein the parameter comprises the adjustment factor.

Aspect 25: The method of any of aspects 22 through 24, wherein the parameter comprises a second indication of the first frequency domain resource allocation of the first transport block.

Aspect 26: The method of any of aspects 22 through 25, further comprising: determining an index associated with stored values of the first frequency domain resource allocation of the first transport block, wherein the parameter comprises the index.

Aspect 27: The method of aspect 26, wherein the stored values include one or more frequency domain resources, one or more scaling factors, or one or more adjustment factors associated with the first frequency domain resource allocation.

Aspect 28: The method of any of aspects 22 through 27, wherein transmitting the control information further comprises: transmitting the control information including a second indication comprising an index associated with stored values of the first frequency domain resource allocation of the first transport block and with stored values of the second frequency domain resource allocation for the second transport block.

Aspect 29: The method of any of aspects 22 through 28, wherein the indication of the second frequency domain resource allocation of the second transport block comprises an indication of a leading subchannel.

Aspect 30: The method of any of aspects 22 through 29, further comprising: determining a size of the second transport block; transmitting, over a second sidelink channel, second control information including a second parameter associated with the size of the second transport block.

Aspect 31: The method of aspect 30, wherein transmitting the second control information further comprises: transmitting, within the second control information, code block group information associated with the first transport block, wherein the size of the second transport block is based at least in part on the code block group information.

Aspect 32: The method of any of aspects 30 through 31, wherein transmitting the second control information further comprises: transmitting the second control information including a scaling factor, wherein the second parameter comprises the scaling factor.

Aspect 33: The method of any of aspects 30 through 32, wherein transmitting the second control information further comprises: transmitting the second control information including an adjustment factor, wherein the second parameter comprises the adjustment factor.

Aspect 34: The method of any of aspects 30 through 33, wherein the second parameter comprises a second index associated with stored values associated with transport block size and wherein determining the size of the second transport block further comprises: identifying a stored value associated with the second index and corresponding to the size of the second transport block.

Aspect 35: The method of any of aspects 30 through 34, wherein transmitting the second control information further comprises: transmitting the second control information including a bit field indicating the size of the second transport block.

Aspect 36: The method of any of aspects 22 through 35, wherein the control information corresponds to a format, the first frequency domain resource allocation of the first transport block is based at least in part on the format of the control information.

Aspect 37: The method of aspect 36, wherein the control information comprises sidelink control information.

Aspect 38: The method of any of aspects 22 through 37, further comprising: receiving, from a second wireless device over the sidelink channel, a request to retransmit a portion of the first transport block, wherein the second transport block comprises the portion of the first transport block.

Aspect 39: The method of aspect 38, wherein the request to retransmit the portion of the first transport block comprises an indication of an amount of frequency domain resources for the second transport block.

Aspect 40: The method of any of aspects 22 through 39, wherein the control information is associated with a configured grant for sidelink communications.

Aspect 41: The method of any of aspects 22 through 40, wherein the control information is communicated over a physical sidelink control channel and the first transport block and the second transport block are communicated over a physical sidelink shared channel.

Aspect 42: An apparatus for wireless communications at a wireless device, comprising a processor; memory coupled with the processor; and instructions stored in the memory and executable by the processor to cause the apparatus to perform a method of any of aspects 1 through 21.

Aspect 43: An apparatus for wireless communications at a wireless device, comprising at least one means for performing a method of any of aspects 1 through 21.

Aspect 44: A non-transitory computer-readable medium storing code for wireless communications at a wireless device, the code comprising instructions executable by a processor to perform a method of any of aspects 1 through 21.

Aspect 45: An apparatus for wireless communications at a wireless device, comprising a processor; memory coupled with the processor; and instructions stored in the memory and executable by the processor to cause the apparatus to perform a method of any of aspects 22 through 41.

Aspect 46: An apparatus for wireless communications at a wireless device, comprising at least one means for performing a method of any of aspects 22 through 41.

Aspect 47: A non-transitory computer-readable medium storing code for wireless communications at a wireless device, the code comprising instructions executable by a processor to perform a method of any of aspects 22 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
    receiving, via a sidelink channel, control information comprising a parameter associated with a first frequency domain resource allocation of a first transport block associated with an initial transmission and an indication of a second frequency domain resource allocation of a second transport block associated with a subsequent transmission after the initial transmission, wherein the parameter comprises a scaling factor indicating that a size of the first frequency domain resource allocation is different than a size of the second frequency domain resource allocation;
    identifying the first frequency domain resource allocation of the first transport block based at least in part on receiving the control information that includes the parameter and the indication;
    communicating, with a second wireless device via the sidelink channel, one or more signals based at least in part on identifying the first frequency domain resource allocation of the first transport block and receiving the indication of the second frequency domain resource allocation of the second transport block; and
    transmitting, to the second wireless device via the sidelink channel, a request to retransmit a portion of the first transport block, the second transport block comprising the portion of the first transport block based at least in part on the request, and the request comprising an indication of an amount of frequency domain resources for the second transport block.

2. The method of claim 1, wherein identifying the first frequency domain resource allocation further comprises:
    applying the scaling factor to the second frequency domain resource allocation.

3. The method of claim 1, wherein identifying the first frequency domain resource allocation further comprises:
    combining an adjustment factor with the second frequency domain resource allocation, wherein the parameter associated with the first frequency domain resource allocation of the first transport block comprises the adjustment factor.

4. The method of claim 1, wherein
    the parameter comprises a second indication of the first frequency domain resource allocation of the first transport block, and
    identifying the first frequency domain resource allocation is based at least in part on the second indication included in the control information.

5. The method of claim 1, wherein the parameter comprises an index associated with stored values of the first frequency domain resource allocation of the first transport block.

6. The method of claim 5, further comprising:
    identifying a stored value of the stored values that is associated with the index based at least in part on receiving the index, wherein identifying the first frequency domain resource allocation is based at least in part on the stored value.

7. The method of claim 6, wherein the stored values include one or more frequency domain resources, one or more scaling factors, or one or more adjustment factors associated with the first frequency domain resource allocation.

8. The method of claim 1, wherein the control information includes a second indication comprising an index associated with stored values of the first frequency domain resource allocation of the first transport block and with stored values of the second frequency domain resource allocation for the second transport block.

9. The method of claim 1, wherein the indication of the second frequency domain resource allocation of the second transport block comprises an indication of a leading sub-channel.

10. The method of claim 1, further comprising:
    receiving, over a second sidelink channel, second control information including a second parameter associated with a size of the second transport block; and
    determining the size of the second transport block based at least in part on receiving the second control information.

11. The method of claim 10, wherein determining the size of the second transport block further comprises:
    identifying, within the second control information, code block group information associated with the first transport block, wherein the size of the second transport block is based at least in part on the code block group information.

12. The method of claim 10, wherein determining the size of the second transport block further comprises:
    applying a second scaling factor to a size of the first transport block, wherein the second parameter comprises the second scaling factor.

13. The method of claim 10, wherein determining the size of the second transport block further comprises:
    combining an adjustment factor with a size of the first transport block, wherein the second parameter comprises the adjustment factor.

14. The method of claim 10, wherein the second parameter comprises a second index associated with stored values associated with transport block size and wherein determining the size of the second transport block further comprises:
    identifying a stored value associated with the second index and corresponding to the size of the second transport block.

15. The method of claim 10, wherein determining the size of the second transport block further comprises:
    identifying, within the second control information, a bit field indicating the size of the second transport block.

16. The method of claim 1, further comprising:
    identifying a format associated with the control information, wherein identifying the first frequency domain resource allocation of the first transport block is based at least in part on the format associated with the control information.

17. The method of claim 16, wherein the control information comprises sidelink control information.

18. The method of claim 1, wherein the control information is associated with a configured grant for sidelink communications.

19. The method of claim 1, wherein the control information is communicated over a physical sidelink control channel and the first transport block and the second transport block are communicated over a physical sidelink shared channel.

20. A method for wireless communications at a first wireless device, comprising:
- identifying a first frequency domain resource allocation of a first transport block associated with an initial transmission;
- identifying a second frequency domain resource allocation of a second transport block associated with a subsequent transmission, wherein identifying the first frequency domain resource allocation is based at least in part on identifying the second frequency domain resource allocation of the second transport block;
- transmitting, via a sidelink channel, control information comprising a parameter associated with the first frequency domain resource allocation and an indication of the second frequency domain resource allocation, wherein the parameter comprises a scaling factor indicating that a size of the first frequency domain resource allocation is different than a size of the second frequency domain resource allocation;
- communicating, with a second wireless device via the sidelink channel, one or more signals based at least in part on identifying the first frequency domain resource allocation of the first transport block and identifying the second frequency domain resource allocation of the second transport block; and
- receiving, from the second wireless device via the sidelink channel, a request to retransmit a portion of the first transport block, the second transport block comprising the portion of the first transport block based at least in part on the request, and the request comprising an indication of an amount of frequency domain resources for the second transport block.

21. The method of claim 20, wherein transmitting the control information further comprises:
- transmitting the control information including an adjustment factor, wherein the parameter comprises the adjustment factor.

22. The method of claim 20, wherein the parameter comprises a second indication of the first frequency domain resource allocation of the first transport block.

23. The method of claim 20, further comprising:
- determining an index associated with stored values of the first frequency domain resource allocation of the first transport block, wherein the parameter comprises the index.

24. The method of claim 20, further comprising:
- determining a size of the second transport block; and
- transmitting, over a second sidelink channel, second control information including a second parameter associated with the size of the second transport block.

25. An apparatus for wireless communications at a first wireless device, comprising:
- a processor;
- memory coupled with the processor; and
- instructions stored in the memory and executable by the processor to cause the apparatus to:
  - receive, via a sidelink channel, control information comprising a parameter associated with a first frequency domain resource allocation of a first transport block associated with an initial transmission and an indication of a second frequency domain resource allocation of a second transport block associated with a subsequent transmission after the initial transmission, wherein the parameter comprises a scaling factor indicating that a size of the first frequency domain resource allocation is different than a size of the second frequency domain resource allocation;
  - identify the first frequency domain resource allocation of the first transport block based at least in part on receiving the control information that includes the parameter and the indication;
  - communicate, with a second wireless device via the sidelink channel, one or more signals based at least in part on identifying the first frequency domain resource allocation of the first transport block and receiving the indication of the second frequency domain resource allocation of the second transport block; and
  - transmit, to the second wireless device via the sidelink channel, a request to retransmit a portion of the first transport block, the second transport block comprising the portion of the first transport block based at least in part on the request, and the request comprising an indication of an amount of frequency domain resources for the second transport block.

26. An apparatus for wireless communications at a first wireless device, comprising:
- a processor;
- memory coupled with the processor; and
- instructions stored in the memory and executable by the processor to cause the apparatus to:
  - identify a first frequency domain resource allocation of a first transport block associated with an initial transmission;
  - identify a second frequency domain resource allocation of a second transport block associated with a subsequent transmission, wherein identifying the first frequency domain resource allocation is based at least in part on identifying the second frequency domain resource allocation of the second transport block;
  - transmit, via a sidelink channel, control information comprising a parameter associated with the first frequency domain resource allocation and an indication of the second frequency domain resource allocation, wherein the parameter comprises a scaling factor indicating that a size of the first frequency domain resource allocation is different than a size of the second frequency domain resource allocation;
  - communicate, with a second wireless device via the sidelink channel, one or more signals based at least in part on identifying the first frequency domain resource allocation of the first transport block and identifying the second frequency domain resource allocation of the second transport block; and
  - receive, from the second wireless device via the sidelink channel, a request to retransmit a portion of the first transport block, the second transport block comprising the portion of the first transport block based at least in part on the request, and the request comprising an indication of an amount of frequency domain resources for the second transport block.

* * * * *